(12) United States Patent
Kons

(10) Patent No.: US 12,328,206 B2
(45) Date of Patent: Jun. 10, 2025

(54) ITERATIVE DECODING OF ORTHOGONAL TIME FREQUENCY SPACE WAVEFORMS IN THE DELAY-DOPPLER DOMAIN

(71) Applicant: Cohere Technologies, Inc., San Jose, CA (US)

(72) Inventor: Shachar Kons, San Jose, CA (US)

(73) Assignee: Cohere Technologies, Inc., San Jose, CA (US)

( * ) Notice: Subject to any disclaimer, the term of this patent is extended or adjusted under 35 U.S.C. 154(b) by 25 days.

(21) Appl. No.: 18/551,548

(22) PCT Filed: Mar. 31, 2022

(86) PCT No.: PCT/US2022/071457
§ 371 (c)(1),
(2) Date: Sep. 20, 2023

(87) PCT Pub. No.: WO2022/213100
PCT Pub. Date: Oct. 6, 2022

(65) Prior Publication Data
US 2024/0195660 A1    Jun. 13, 2024

Related U.S. Application Data

(60) Provisional application No. 63/168,882, filed on Mar. 31, 2021.

(51) Int. Cl.
*H04L 25/02* (2006.01)
*H04L 25/03* (2006.01)
*H04L 27/26* (2006.01)

(52) U.S. Cl.
CPC .... *H04L 25/0224* (2013.01); *H04L 25/03171* (2013.01); *H04L 27/2639* (2013.01); *H04L 27/26532* (2021.01)

(58) Field of Classification Search
CPC ...... H04B 7/0413; H04B 7/0456; H04B 1/69; H04B 17/373; H04B 7/06; H04B 1/0475;
(Continued)

(56) References Cited

U.S. PATENT DOCUMENTS 5,870,412 A * 2/1999 Schuster ............... H04L 1/0056
714/752
10,873,418 B2    12/2020 Kons et al.
(Continued)

FOREIGN PATENT DOCUMENTS

WO    2018/191309    10/2018
WO    2019/241436    12/2019

OTHER PUBLICATIONS

Extended European Search Report for EP Appl. No. 22 782 420.8, dated Sep. 9, 2024, 11 pages.
(Continued)

*Primary Examiner* — Eva Y Puente
(74) *Attorney, Agent, or Firm* — Perkins Coie LLP

(57) ABSTRACT

Methods, systems and devices for wireless communication are described. One method includes obtaining a two-dimensional delay-Doppler representation of a received wireless signal that is received over a wireless channel, determining an estimated channel response of the wireless channel from a portion of the delay-Doppler grid corresponding to a channel estimation portion, performing, using the estimated channel response, channel equalization in the delay-Doppler domain, generating, based on the channel equalization, a posteriori probability estimates of data symbols in the received wireless signal, wherein the a posteriori probability estimates are generated based on a priori feedback that is generated using an iterative process and further processing the a posteriori probability estimates of data symbols to recover information bits from the received wireless signal.

19 Claims, 27 Drawing Sheets

(58) Field of Classification Search
CPC .... H04B 7/0857; H04B 17/345; H04B 7/005; H04L 5/0007; H04L 27/2639; H04L 27/2601; H04L 27/2604; H04L 5/0044; H04W 24/08; H04W 72/0446; H04W 72/04; H04W 72/0453; H04W 24/10; H04W 72/30; H04W 74/0833; H04W 88/02

See application file for complete search history.

(56) References Cited

U.S. PATENT DOCUMENTS

| | | | |
|---|---|---|---|
| 11,362,872 B2 * | 6/2022 | Hadani | H04L 5/0023 |
| 2008/0028274 A1 * | 1/2008 | Lin | H03M 13/1111 |
| | | | 714/752 |
| 2014/0153628 A1 * | 6/2014 | Vojcic | H03M 13/612 |
| | | | 375/227 |
| 2019/0036741 A1 | 1/2019 | Hadani et al. | |
| 2020/0067758 A1 * | 2/2020 | Reuven | H04B 7/0413 |
| 2020/0313695 A1 | 10/2020 | Namboodiri et al. | |
| 2023/0164013 A1 * | 5/2023 | Kons | H04L 27/26532 |
| 2023/0403189 A1 * | 12/2023 | Ksairi | H04L 27/2607 |

OTHER PUBLICATIONS

Thaj et al. "Low Complexity Iterative Rake Decision Feedback Equalizer for Zero-Padded OTFS Systems" IEEE Transactions on Vehicular Technology. vol. 69. No. 12, Dec. 2020, 17 pages.

Raveiteja et al. "Embedded Delay-Doppler Channel Estimation for Orthogonal Time Frequency Space Modulation" 2018 IEEE 88th Vehicular Technology Conference (VTC-Fall), IEEE, Aug. 27, 2018, 5 pages.

International Search Report and Written Opinion for PCT/US2022/71457, dated Sep. 9, 2022, 25 pages.

* cited by examiner

ITERATIVE DECODING OF ORTHOGONAL TIME FREQUENCY SPACE WAVEFORMS IN THE DELAY-DOPPLER DOMAIN

CROSS-REFERENCE TO RELATED APPLICATIONS

This application is a 371 National Phase Application of PCT Application No. PCT/US2022/071457 entitled "ITERATIVE DECODING OF ORTHOGONAL TIME FREQUENCY SPACE WAVEFORMS IN THE DELAY-DOPPLER DOMAIN" filed on Mar. 31, 2022, which claims priority to U.S. Provisional Application No. 63/168,882, filed on Mar. 31, 2021, the disclosure of which is hereby incorporated by reference herein in its entirety.

TECHNICAL FIELD

This document relates to signal processing in wireless communication systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

Wireless signal processing techniques are described. These techniques may be implemented by a transmission or a reception apparatus.

In one example aspect, a method of wireless communication is disclosed. The method includes obtaining a two-dimensional delay-Doppler representation of a received wireless signal that is received over a wireless channel, determining an estimated channel response of the wireless channel from a portion of the delay-Doppler grid corresponding to a channel estimation portion, performing, using the estimated channel response, channel equalization in the delay-Doppler domain, generating, based on the channel equalization, a posteriori probability estimates of data symbols in the received wireless signal, wherein the a posteriori probability estimates are generated based on a priori feedback that is generated using an iterative process, and further processing the a posteriori probability estimates of data symbols to recover information bits from the received wireless signal.

In another example aspect, another method of wireless communication is disclosed. The method includes obtaining two-dimensional delay-Doppler representations of a received wireless signal that is received over a multi-input multi-output (MIMO) wireless channel, determining an estimated channel response of the MIMO wireless channel from portions of the delay-Doppler grids corresponding to channel estimation portions, performing, using the estimated channel response, channel equalization in the delay-Doppler domain, generating, based on the channel equalization, a posteriori probability estimates of data symbols in the received wireless signal, wherein the a posteriori probability estimates are generated based on a priori feedback that is generated using an iterative process, and further processing the a posteriori probability estimates of data symbols to recover information bits from the received wireless signal.

In yet another example aspect, another wireless communication method is disclosed. The method includes allocating transmission resources in a delay-Doppler grid to a number of transmission sources and transforming the delay-Doppler grid into a time-frequency domain transmission waveform that is transmitted over a wireless channel.

In yet another example aspect, a wireless communication apparatus comprising a processor and transmission/reception circuitry is disclosed. The apparatus implements an above-described communication method.

These, and other, features are described throughout the present document.

DRAWINGS

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only. Furthermore, certain standard-specific terms are used for illustrative purpose only, and the disclosed techniques are applicable to any wireless communication systems.

In recent years, a powerful new technique for transmission/reception of wireless signals has been introduced. This technique provides significant improvement over conventional signal transmissions techniques by allowing direct mapping of signals by characterizing the wireless channel according to transmission delay and Doppler shift experienced by the wireless signals during transmission. The signal modulation technique is sometimes called Orthogonal Time Frequency Space (OTFS) modulation.

In one beneficial use, the techniques described in the present document may be used by implementations of transmitters or receivers of OTFS signals by implementing receiver-side techniques such as channel equalization directly in the delay-Doppler domain. Such an implementation may be able to avoid the additional computational complexity of transforming signal representations between delay-Doppler domain and conventionally used time-frequency domain representations.

In another beneficial advantage, the present document discloses transmitter-side techniques that can be used by embodiments for generating an OTFS modulated wireless signal waveform using one of the several methods described herein.

These, and other, beneficial aspects are further described throughout the present document.

1. Example Wireless Systems

Figure 15:
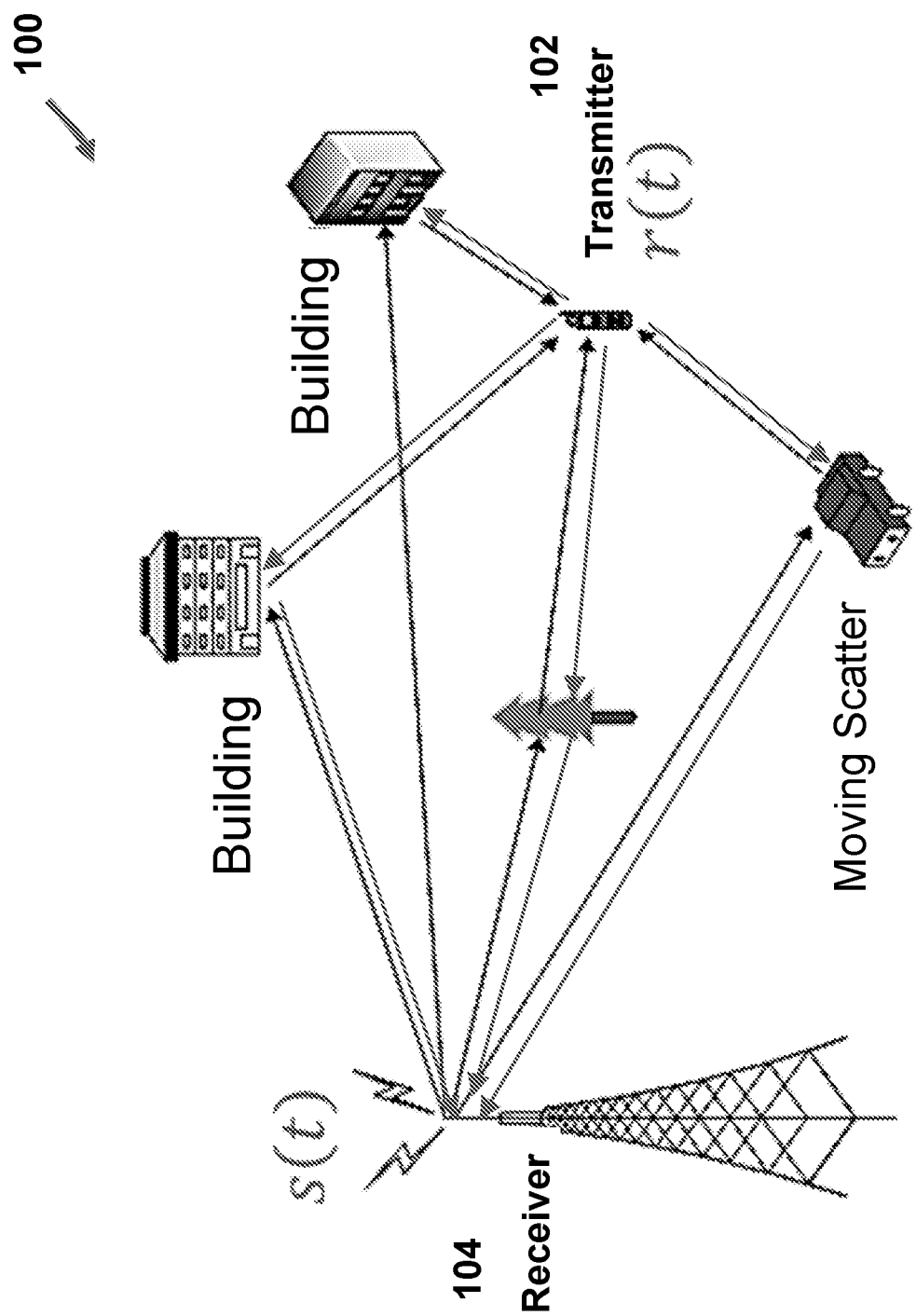
FIG. 15 shows an example of a wireless communications system.

FIG. 15 shows an example of a wireless communication system 100 in which a transmitter device 102 transmits signals to a receiver 104. The signals may undergo various wireless channels and multipaths, as depicted. Some reflectors such as buildings and trees may be static, while others such as cars, may be moving scatterers. The transmitter device 102 may be, for example, a user device, a mobile phone, a tablet, a computer, or another Internet of Things (IOT) device such as a smartwatch, a camera, and so on. The receiver device 104 may be a network device such as the base station. The signals transmitted from the base station to the transmitter 102 may experience similar channel degradations produced by static or moving scatterers. The techniques described in the present document may be implemented by the devices in the wireless communication system 100. The terms "transmitter" and "receiver" are simply used for convenience of explanation and, as further described herein, depending on the direction of transmission (uplink or downlink), the network station may be transmitting or receiving and user device may be receiving or transmitting.

Figure 16:
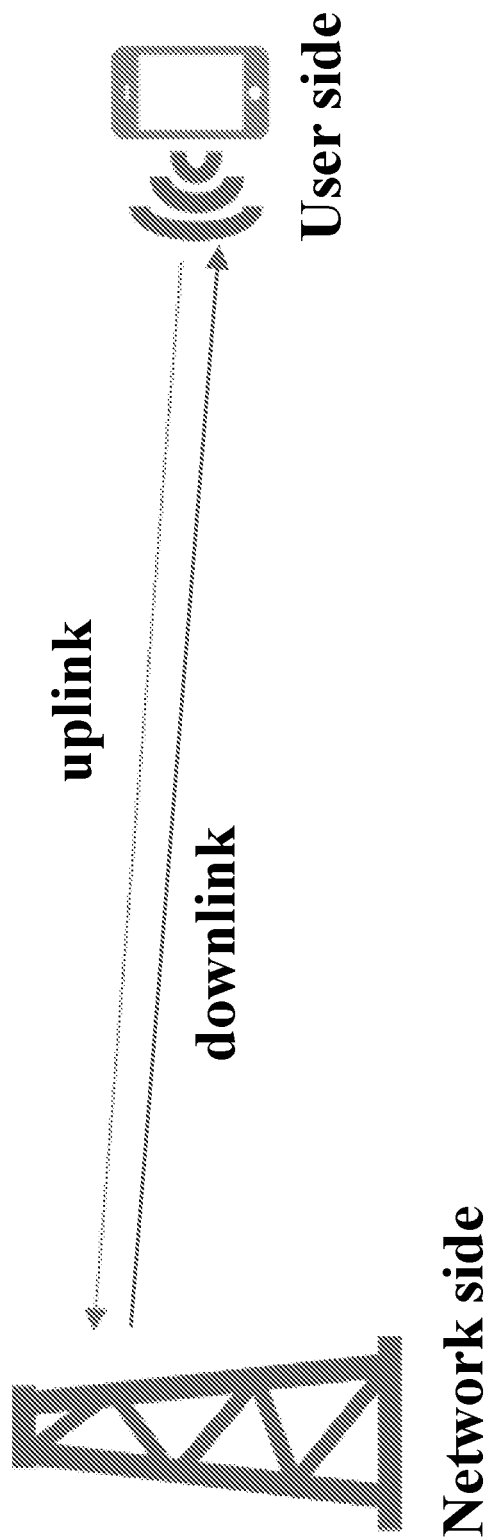
FIG. 16 shows an example of a wireless network.

FIG. 16 shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 16, the direction of transmission may reversed. Such transmissions are often called uplink or upstream transmissions. For such transmissions, one or more user devices act as transmitters of the wireless signals and a network-side node such as the base station acts as the receiver of these signals (as depicted in FIG. 16). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot based transmissions. Other types of multiplexing are also possible (e.g., code division multiplexing, orthogonal time frequency space, or OTFS, multiplexing, spatial multiplexing, etc.). In general, the various multiplexing schemes can be combined with each other. For example, in spatially multiplexed systems, transmissions to and from two different user devices may be isolated from each other using directional or orientational difference between the two end points (e.g., the user devices and a network station such as a base station).

2. Initial Discussion

This document describes, among other things, a novel method for iterative decoding of an Orthogonal Time Frequency Space (OTFS) waveform in delay-Doppler. The iterative method consists of channel estimation in delay-Doppler, data symbol equalization and Forward-Error-Correction (FEC) decoding. For simplicity, the description is provided for a Single-Input-Single-Output (SISO) system with one antenna port at the transmitter and one antenna port at the receiver. A straightforward extension for multiple antenna ports is given afterwards.

2.1 Overview of OTFS

Embodiments of the OTFS methods and systems described herein are based, in part, upon the realization that spreading the data for any given symbol over time, spectrum, and/or spectral shapes in the manner described herein yields modulated signals which are substantially resistant to interference, particularly interference caused by Doppler effects and multi-path effects, as well as general background noise effects. Moreover, the OTFS method is believed to require less precise frequency synchronization between receiver and transmitter than is required by existing communication systems (e.g., OFDM systems).

In essence, the OTFS method convolves the data for a group of $N^2$ symbols (herein called a "frame") over both time, frequency, and in some embodiments spectral shape in a way that results in the data for the group of symbols being sent over a generally longer period of time than in prior art methods. Use of the OTFS method also results in the data for any given group of symbols being accumulated over a generally longer period of time than in prior art methods. However, in certain embodiments the OTFS method may nonetheless enable favorable data rates to be achieved despite the use of such longer transmission periods by exploiting other transmission efficiencies enabled by the method. For example, in one embodiment a group of symbols may be transmitted using the same spread-spectrum code. Although this could otherwise result in confusion and ambiguity (since each symbol would not be uniquely associated with a code), use of the OTFS method may, for example, enable the symbols to be sent using different (but previously defined) spread-spectrum convolution methods across a range of time and frequency periods. As a consequence, when all of the data corresponding to the symbols is finally accumulated within the receiver, the entire frame or group of symbols may be reconstructed in a manner not contemplated by prior art techniques. In general, one trade-off associated with the disclosed approach is that either an entire multi-symbol frame of data will be correctly received, or none of the frame will be correctly received; that is, if there is too much interference within the communication channel, then the ability to successfully deconvolve and retrieve multiple symbols may fail. However, as will be discussed, various aspects of the OTFS may mitigate any degradation in performance which would otherwise result from this apparent trade-off.

Figure 21:
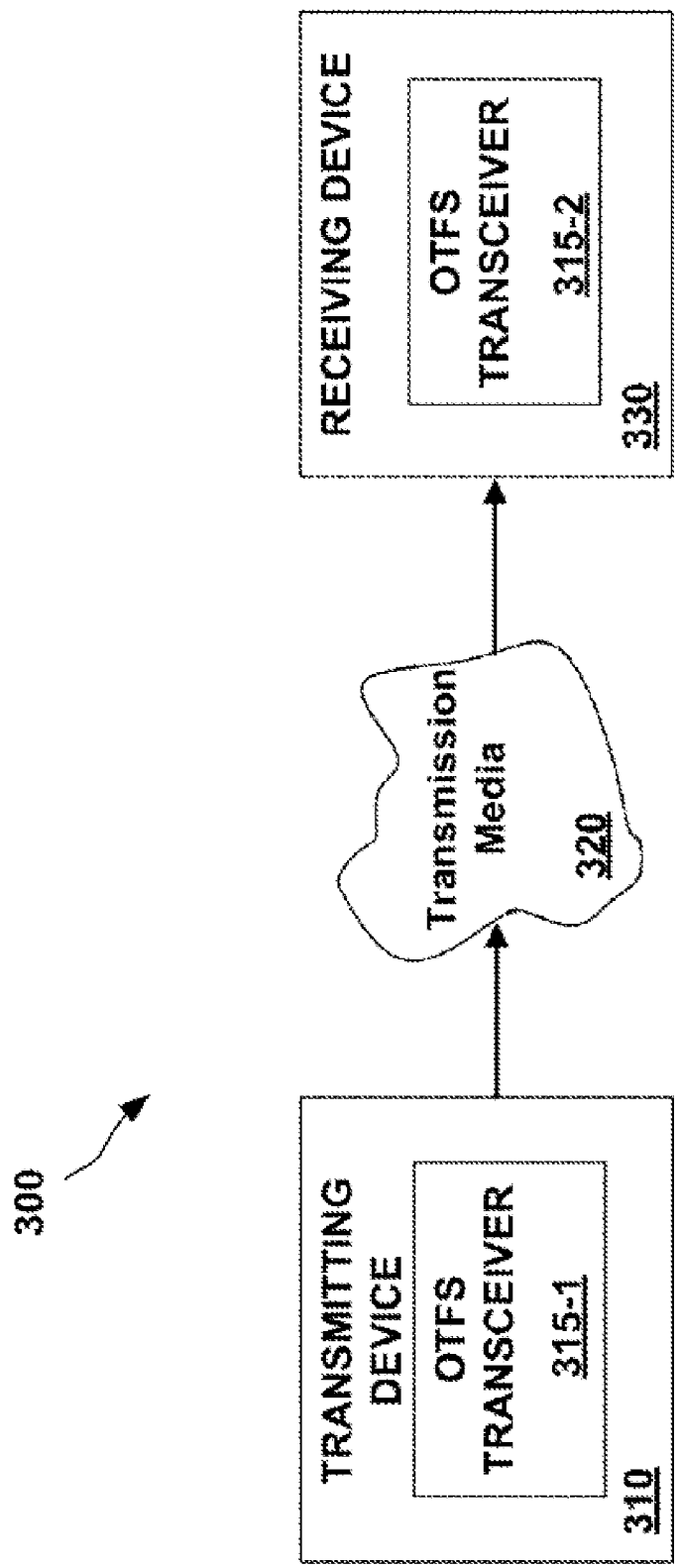
FIG. 21 shows an example block diagram of an OTFS communication system.

FIG. 21 is a block diagram of components of an exemplary OTFS communication system 300. As shown, the system 300 includes a transmitting device 310 and a receiving device 330. The transmitting device 310 and the receiving device 330 include first and second OTFS transceivers 315-1 and 315-2, respectively. The OTFS transceivers 315-1 and 315-2 communicate, either unidirectionally or bidirectionally, via communication channel 320 in the manner described herein. Although in the exemplary embodiments described herein the system 300 may comprise a wireless communication system, in other embodiments the communication channel may comprise a wired communication channel such as, for example, a communication channel within a fiber optic or coaxial cable. As was described above, the communication channel 320 may include multiple pathways and be characterized by time/frequency selective fading.

Figure 22:
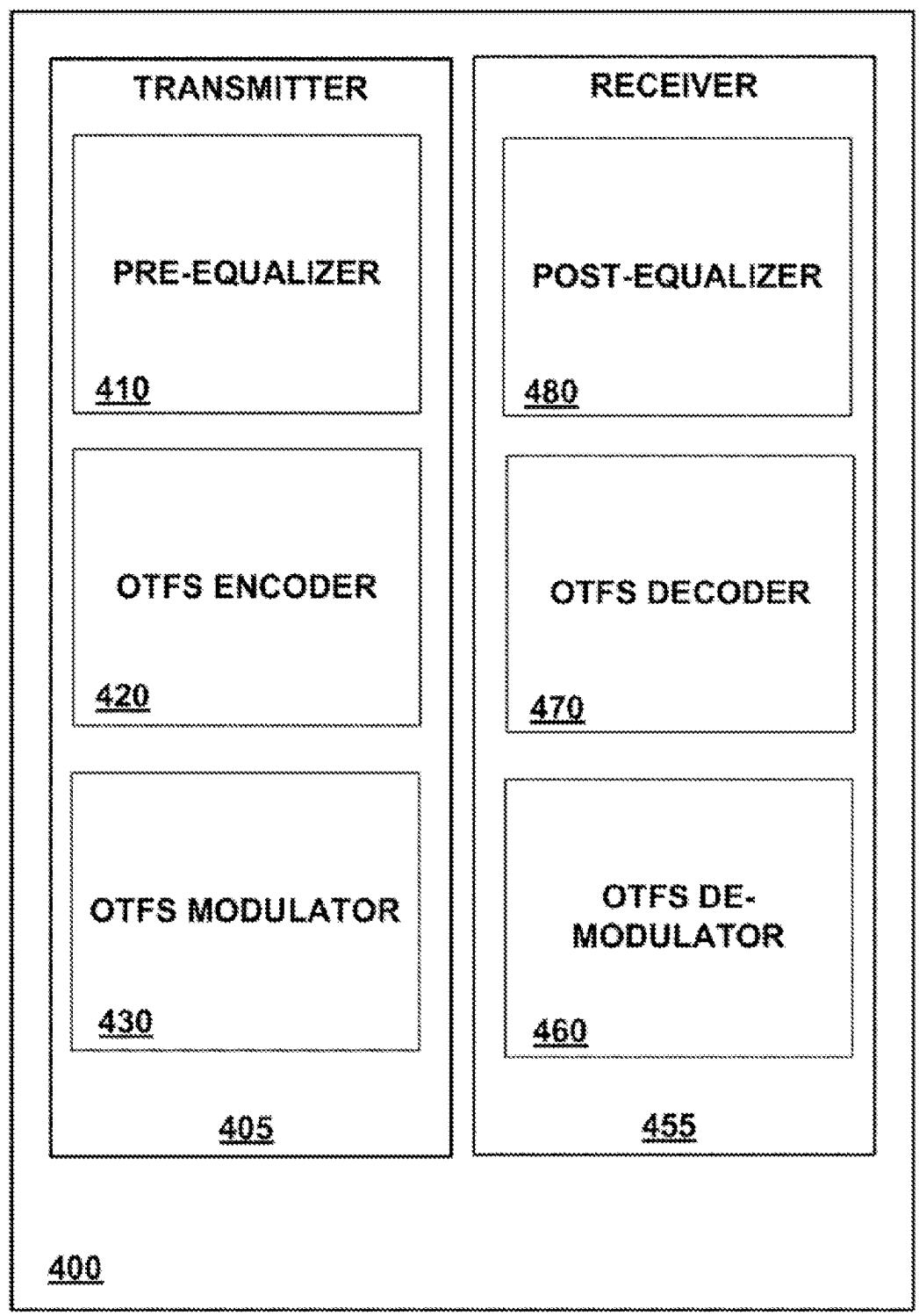
FIG. 22 illustrates components of an example OTFS transceiver.

FIG. 22 illustrates components of an exemplary OTFS transceiver 400. The OTFS transceiver 400 can be used as one or both of the exemplary OTFS transceivers 315 illustrated in the communication system 300 of FIG. 21. The OTFS transceiver 400 includes a transmitter module 405 that includes a pre-equalizer 410, an OTFS encoder 420 and an OTFS modulator 430. The OTFS transceiver 400 also includes a receiver module 455 that includes a post-equalizer 480, an OTFS decoder 470 and an OTFS demodulator 460. The components of the OTFS transceiver may be implemented in hardware, software, or a combination thereof. The disclosed OTFS methods will be described in view of the various components of the transceiver 400.

In one aspect a method of OTFS communication involves transmitting at least one frame of data ([D]) from the transmitting device 310 to the receiving device 330 through the communication channel 320, such frame of data comprising a matrix of up to $N^2$ data elements, N being greater than 1. The method comprises convolving, within the OTFS transceiver 315-1, the data elements of the data frame so that the value of each data element, when transmitted, is spread over a plurality of wireless waveforms, each waveform having a characteristic frequency, and each waveform carrying the convolved results from a plurality of said data elements from the data frame [D]. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving device 330, the OTFS transceiver 315-2 receives and deconvolves these wireless waveforms thereby reconstructing a replica of said at least one frame of data [D]. In the exemplary embodiment the convolution process is such that an arbitrary data element of an arbitrary frame of data ([D]) cannot be guaranteed to be reconstructed with full accuracy until substantially all of these wireless waveforms have been transmitted and received.

2.2 Examples of Iterative Signal Separation in OTFS

Figure 23:
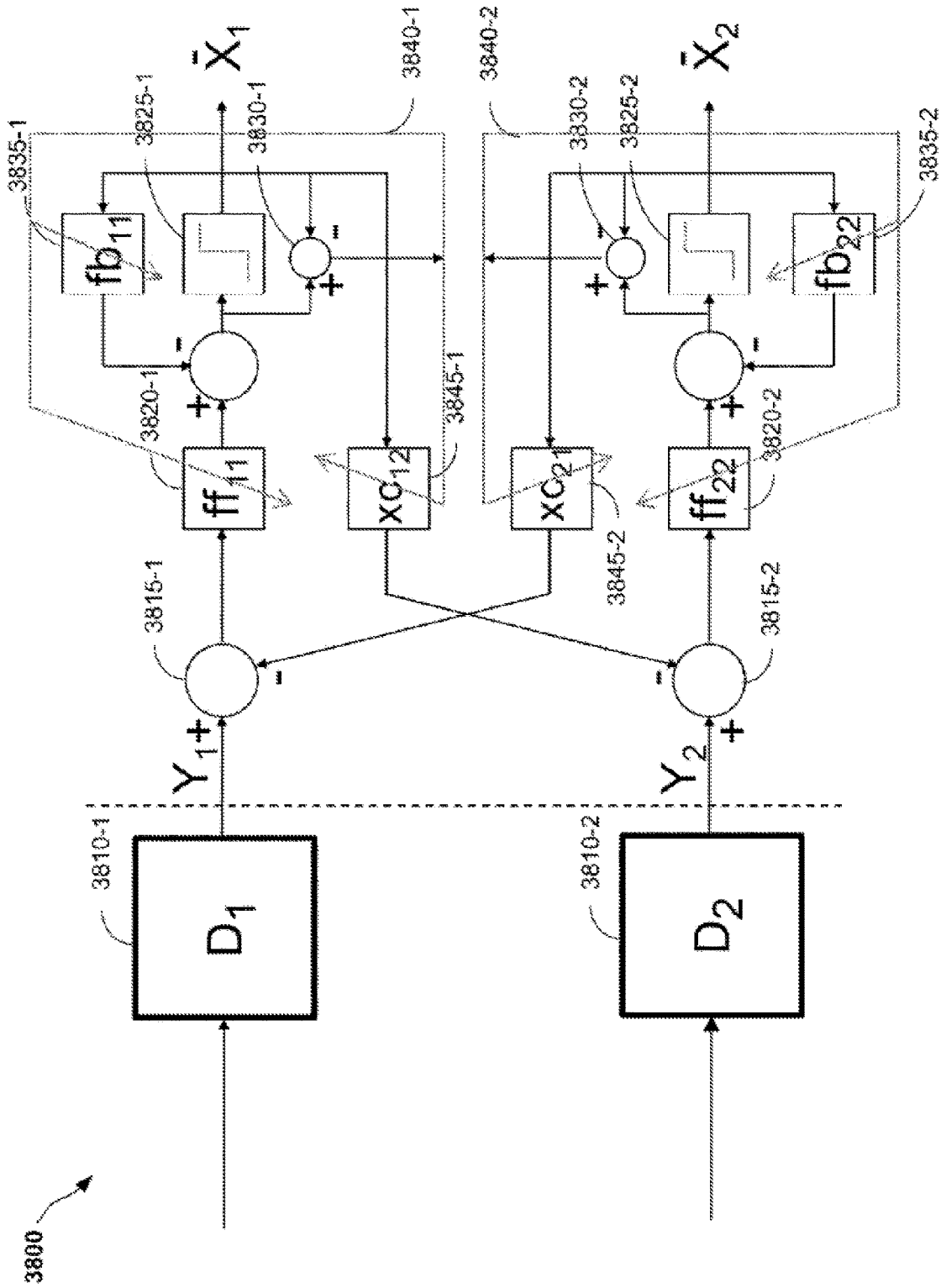
FIG. 23 illustrates an example of an OTFS receiver that provides iterative signal separation in accordance with the disclosure.

FIG. 23 shows an example of an OTFS receiver 3800 that provides iterative signal separation in accordance with the disclosure. The OTFS receiver 3800 receives a first data matrix $D_1$ from a first transmitter that uses a first basis matrix. The OTFS receiver 3800 also receives a second data stream $D_2$ from a second transmitter in the same frequency band where the second data stream $D_2$ was encoded using a second basis matrix different from the first basis matrix. A first OTFS decoder 3810-1 decodes the first data matrix $D_1$ to create a one dimensional data stream $Y_1$ while a second OTFS decoder decodes the second data matrix $D_2$ to form a second one dimensional data stream $Y_2$.

The OTFS receiver 3800 includes a pair of feed-forward and feedback equalizers comprising first and second feed forward equalizers 3820-1 and 3820-2, first and second feedback equalizers 3835-1 and 3835-2, and first and second slicers 3825-1 and 3825-2. First and second subtractors 3830-1 and 3830-2 calculate first and second residual error signals 3840-1 and 3840-2 that are used by respective ones of the feed forward equalizers 3820 and the feedback equalizers 3835 in order to optimize two dimensional time/frequency shift channel models. A pair of cross talk cancellers 3845-1 and 3845-2 also use the residual error signals 3840-1 and 3840-2, respectively, in order to optimize estimates of the first received data signal and the second received data signal in order to subtract each signal at subtractors 3815-1 and 3815-2. In this way, the cross talk from one data signal to the other is minimized.

Figure 24:
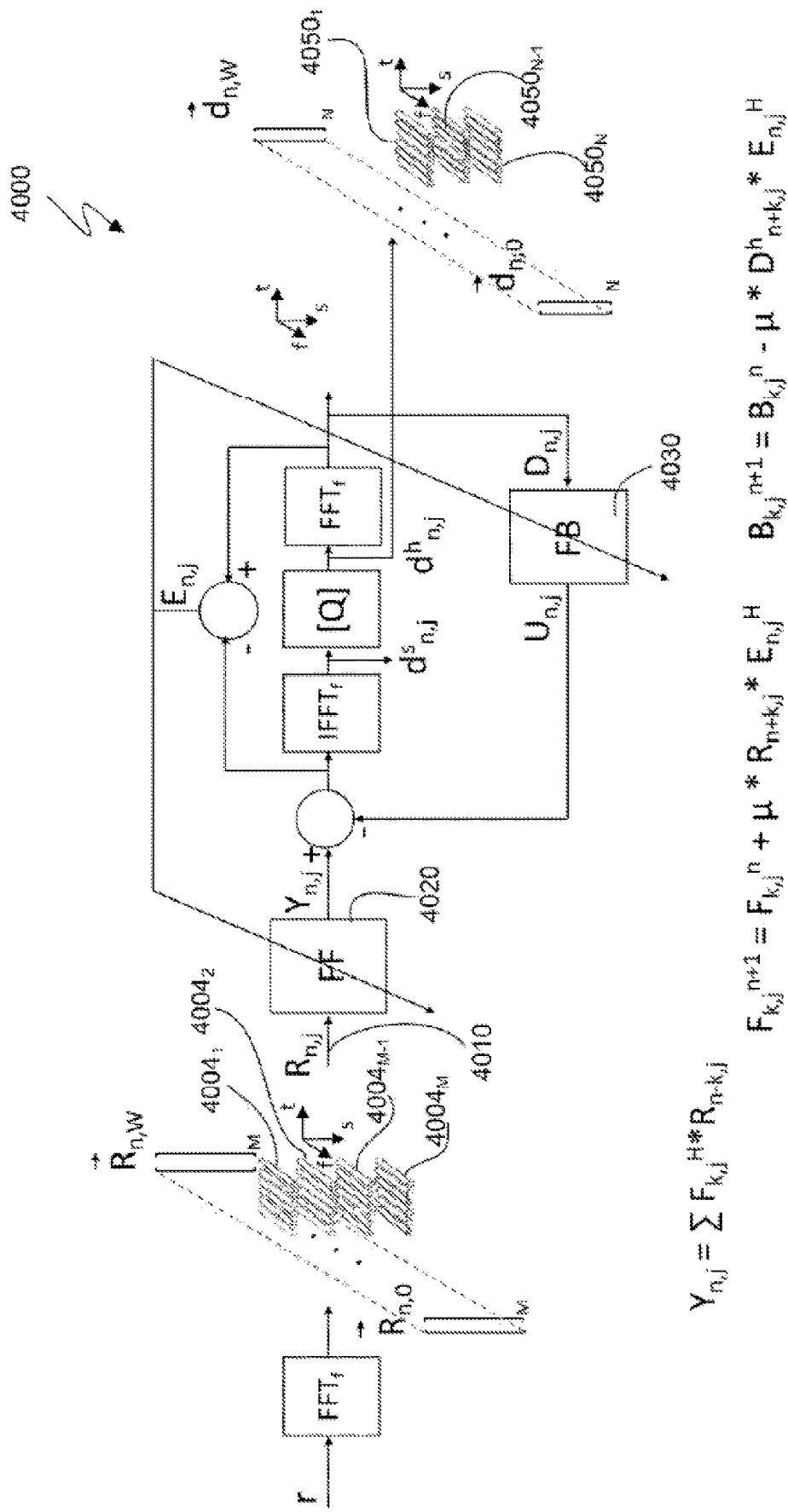
FIG. 24 is a block diagram of a time-frequency-space decision feedback equalizer that may be employed to facilitate signal separation in a multi-antenna OTFS system.

Attention is now directed to FIG. 24, which is a block diagram of a time-frequency-space decision feedback equalizer 4000 that may be employed to facilitate signal separation in a multi-antenna OTFS system. As shown in FIG. 24, received signal information (R) represented by a set of M time-frequency planes 4004 is received at input port 4010 of the equalizer 4000. Each of the M time-frequency planes 4004 represents the information collected from N transmit antenna instances (M>N) by one of M antenna instances associated with an OTFS receiver. The N transmit antenna instances, which may or may not be co-located, will generally be associated with an OTFS transmitter remote from the OTFS receiver associated with the M receive antenna instances. Each of the N transmit antenna instances and M receive antenna instances may, for example, comprise a single physical antenna which is either co-located or not co-located with the other antenna instances. Alternatively, one or more of the N transmit antenna instances and M receive antenna instances may correspond to an antenna instance obtained through polarization techniques.

In the embodiment of FIG. 24, the time-frequency-space decision feedback equalizer 4000 includes a time-frequency-space feedforward FIR filter 4020 and a time-frequency-space feedback FIR filter 4030. The equalizer 4000 produces an equalized data stream at least conceptually arranged in set of N time-frequency planes (M>N) wherein, again, N corresponds to the number of antenna instances transmitting information to the M antenna instances of the OTFS receiver associated with the equalizer 4000.

Again with reference to FIG. 24, operation of an exemplary OTFS system may be characterized as the transmission, from each antenna instance associated with a transmitter, of a time-frequency plane representing a two-dimensional information array being sent. Each such antenna instance, whether co-located or non-co-located, may simultaneously transmit two-dimensional information planes, each independent of the other. The information in each of these information planes may be shifted in time and frequency using the same basis functions. During transmission from each of N transmit antenna instances to each of M receive antenna instances, the information within each transmitted plane is differently affected by the different two-dimensional channels linking one of the N transmit antenna instances to each of the M receive antenna instances.

At each of the M antenna instances associated with an OTFS receiver, each entry within the two-dimensional array of received signal energy being collected will typically include a contribution from each of the N transmit antenna instances involved in transmitting such signal energy. That is, each of the M receive antenna instances collects a mixture of the two-dimensional, time-frequency planes of information separately sent by each of the N transmit antenna instances. Thus, the problem to be solved by the equalizer 4000 may be somewhat simplistically characterized as inversion of the N.times.M "coupling matrix" representative of the various communication channels between the N OTFS transmit antenna instances and the M OTFS receive antenna instances.

In one embodiment each of the N transmit antenna instances sends a pilot signal which may be differentiated from the pilot signals transmitted by the other N−1 antenna instances by its position in the time-frequency plane. These pilot signals enable the OTFS receiver to separately measure each channel and the coupling between each antenna instance. Using this information the receiver essentially initializes the filters present within the equalizer 4000 such that convergence can be achieved more rapidly. In one embodiment an adaptive process is utilized to refine the inverted channel or filter used in separating the received signal energy into different time-frequency-space planes. Thus, the coupling channel between each transmit and receive antenna instance may be measured, the representation of the measured channel inverted, and that inverted channel representation used to separate the received signal energy into separate and distinct time-frequency planes of information.

As noted above, the channel models associated with known conventional communication systems, such as OFDM-based systems, are one-dimensional in nature. As such, these models are incapable of accurately taking into consideration all of the two-dimensional (i.e., time-based and frequency-based) characteristics of the channel, and are limited to providing an estimate of only one such characteristic. Moreover, such one-dimensional channel models change rapidly relative to the time scale of modern communication systems, and thus inversion of the applicable channel representation becomes very difficult, if possible at all.

The stationary two-dimensional time-frequency channel models described herein also enable OFTS systems to effectively implement cross-polarization cancellation. Consider the case in which a transmit antenna instance associated with an OFTS transceiver is configured for horizontally-polarized transmission and a nearby receive antenna of the OFTS transceiver is configured to receive vertically-polarized signal energy. Unfortunately, reflectors proximate either the transmit or receive antenna may reflect and cross-polarize some of the transmitted horizontally-polarized energy from the transmit antenna, some of which may be directed to the receive antenna as a vertically-polarized reflection. It is believed that a two-dimensional channel model of the type disclosed herein is needed in order to decouple and cancel this cross-polarized reflection from the energy otherwise intended for the receive antenna.

3. Examples of Transmitter Signal Processing

An OTFS waveform is generated from elements allocated on a rectangular delay-Doppler grid, with N elements along the Doppler dimension and M elements along the delay dimension. Some of these elements may be data symbols, such as Quadrature-Amplitude-Modulated (QAM) symbols, and some of these elements may be reserved for channel estimation and may have a pilot symbol or have no symbols ("guard" area). An example of such a grid is shown in FIG. 1.

Figure 1:
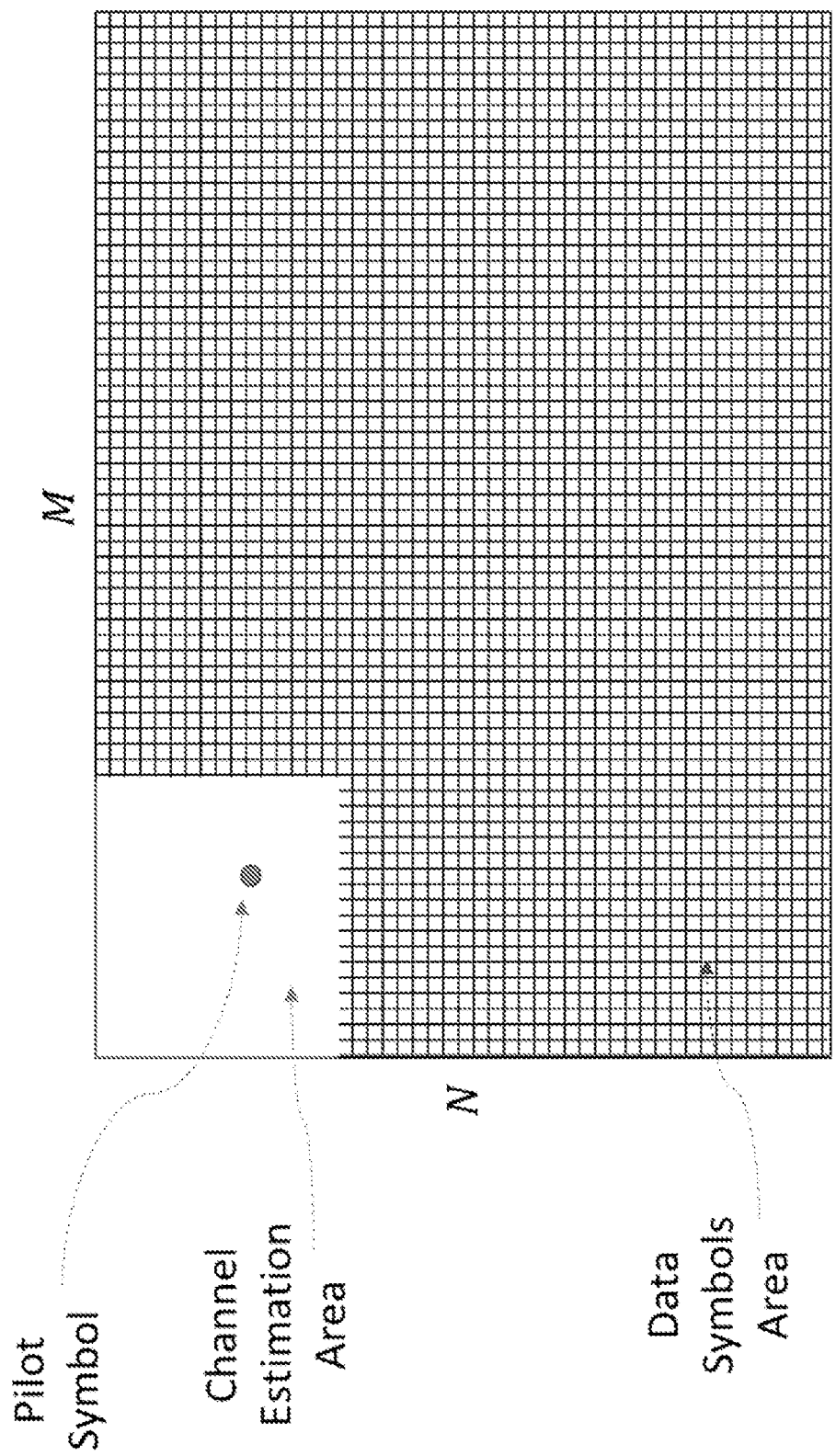
FIG. 1 shows an example of a delay-Doppler grid.

FIG. 1 shows a delay-Doppler grid example with data symbols area and channel estimation area. Some of the grid elements are data symbols, some are not assigned (zero value for guard area) and some are pilot symbols. The channel estimation area may be placed anywhere within the delay-Doppler grid and the pilot symbols may be allocated anywhere within that area. Also, the channel estimation area is not restricted to be rectangular.

Figure 2:
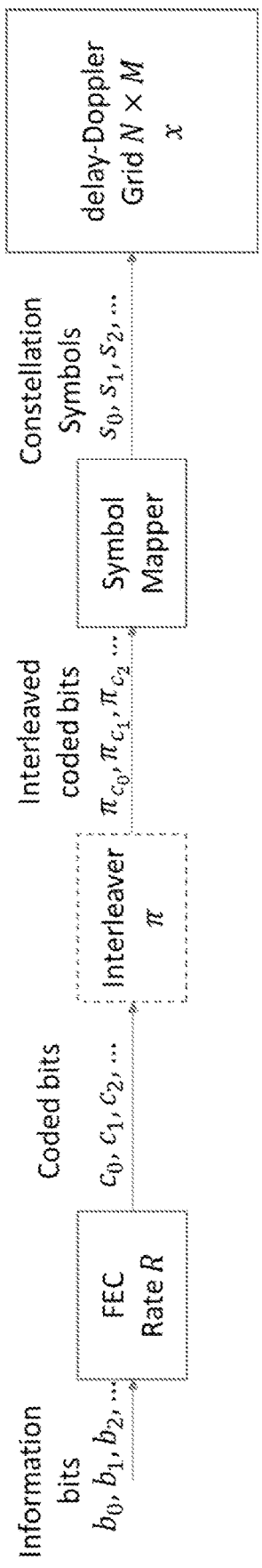
FIG. 2 shows an example of an orthogonal time frequency space (OTFS) delay-Doppler grid.
Figure 3:
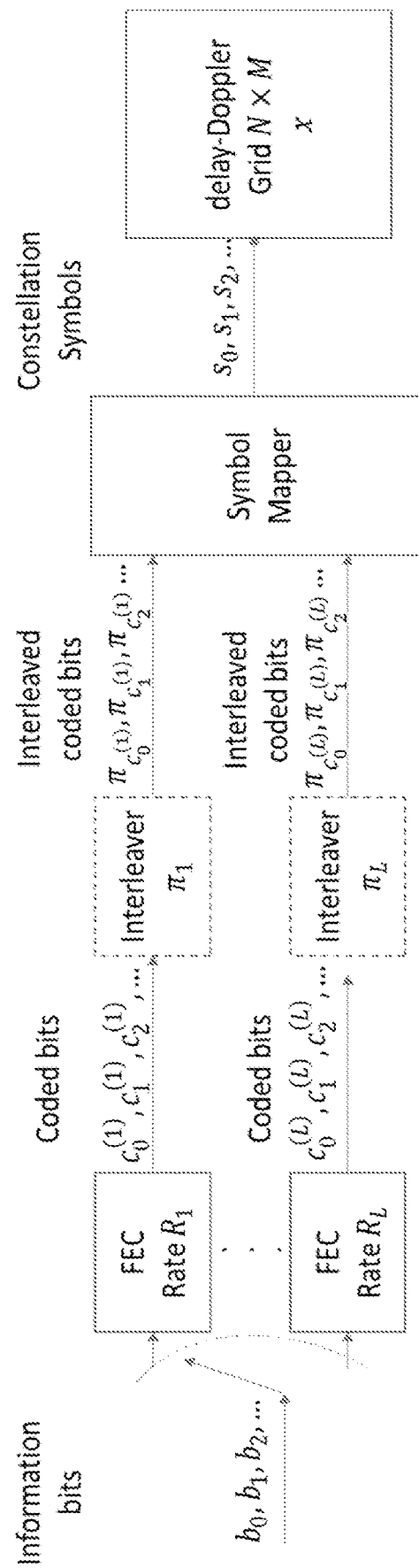
FIG. 3 shows an example of a multi-level encoding scheme.

The data symbols are generated by encoding information bits with an FEC code and mapping the coded bits to constellation symbols. The coded bits may be interleaved before being mapped into constellation symbols. There may be a single FEC code used, as shown in FIG. 2, or multiple codes as part of a multi-level-coding (MLC) scheme, as shown in FIG. 3. The MLC scheme uses different codes or code rates for different bits in the constellation mapping; MLC encoding is discussed in Section 3.1 and MLC decoding is discussed in Section 4.1.

FIG. 2 shows an encoding example for an OTFS delay-Doppler grid. The information bits are encoded by an FEC code with rate R, optionally interleaved and mapped to symbols. These symbols are then allocated to elements in the delay-Doppler grid.

FIG. 3 depicts a multi-level encoding example for an OTFS delay-Doppler grid. The information bits are multiplexed into L levels and encoded with multiple FEC codes of rates $R_1, \ldots, R_L$. The coded bits may be optionally interleaved and then assigned to different bits on the constellation label, to generate constellation symbols. These symbols are then allocated to elements in the delay-Doppler grid.

The dimensions of the channel estimation area depend on the expected channel response and its delay and Doppler spreads. Within the channel estimation area, pilot symbols may be placed. A pilot symbol has a known value, and its power may be larger than the other data symbols.

Figure 4:
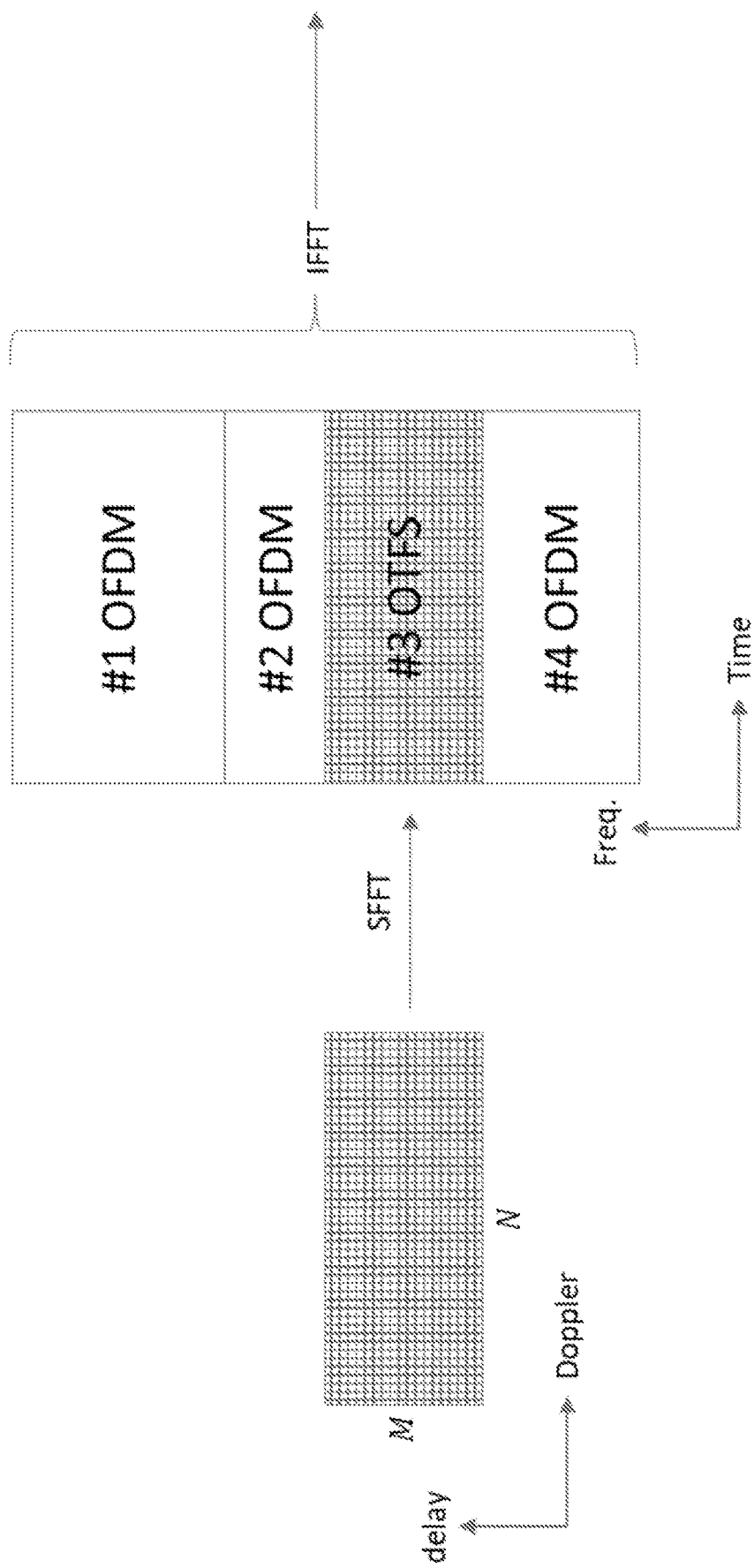
FIG. 4 shows an example of a transmission method in which a delay-Doppler grid is transformed to a time-frequency grid using a Symplectic Fast Fourier Transform (SFFT).
Figure 5:
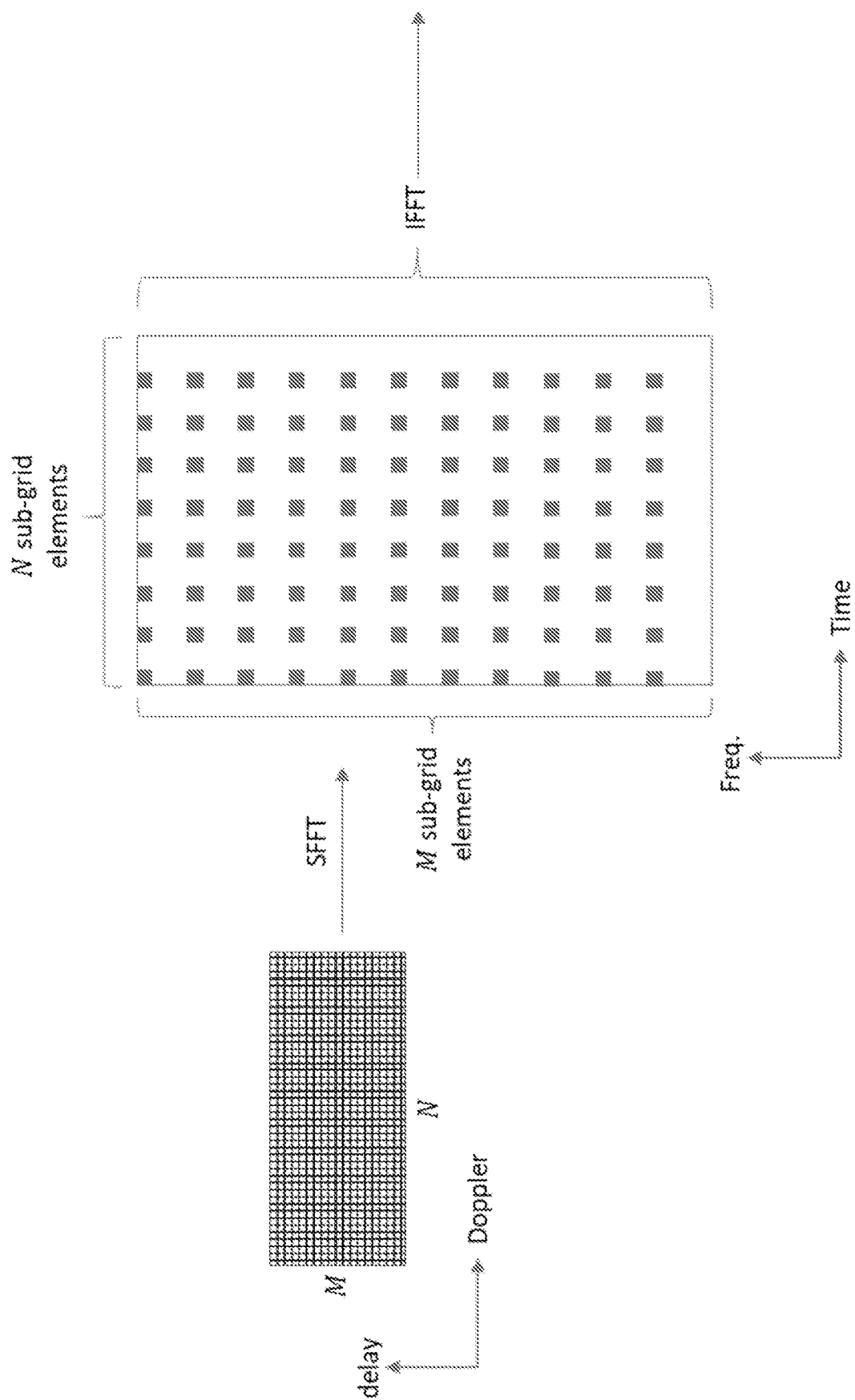
FIG. 5 shows an example of a transmission method in which a delay-Doppler grid is transformed to a time-frequency sub-grid.

The delay-Doppler grid may be transformed to a transmission waveform in one of the following methods:

1. Transformation to a time-frequency equivalent grid via a discrete Symplectic Fast Fourier Transform (SFFT). This method creates a time-frequency grid, like the one used for OFDM modulation. This OTFS transformed grid may be multiplexed with other time-frequency elements in the OFDM grid, as shown in FIG. 4, thus allowing multi-user data multiplexing. Then, an OFDM waveform may be generated using an inverse Fourier transform (IFFT) over each OFDM symbol.
2. Transformation to a time-frequency equivalent sub-grid via discrete SFFT, as shown in FIG. 5. The sub-grid is part of a larger time-frequency grid and has M elements along frequency and N elements along time. Then, an OFDM waveform may be generated using an inverse Fourier transform (IFFT) over each OFDM symbol.
3. Direct transformation to the time domain using a Zak transform over the Doppler dimension of the grid (after extending the grid in a quasi-periodic manner and applying a two-dimensional transmission pulse), as shown in FIG. 6.

FIG. 4 shows an example of transmission method 1, where a delay-Doppler grid is transformed to a time-frequency grid using a Symplectic Fast Fourier Transform (SFFT). This transformed grid, denoted as "#3 OTFS", is multiplexed with the data of other OFDM users (denoted as #1, #2 and #4) in the overall OFDM time-frequency grid. An inverse Fast Fourier Transform (IFFT) may be applied to the OFDM symbols to generate the transmission waveform.

FIG. 5 shows an example of transmission method 2, where a delay-Doppler grid is transformed to a time-frequency sub-grid with N elements along the time dimension and M elements along the frequency dimension, using a Symplectic Fast Fourier Transform (SFFT). Note, that the sub-grid may not take all the time-frequency resources and other sub-grids may be also allocated for other delay-Doppler transformations (possibly of different users).

Figure 6:
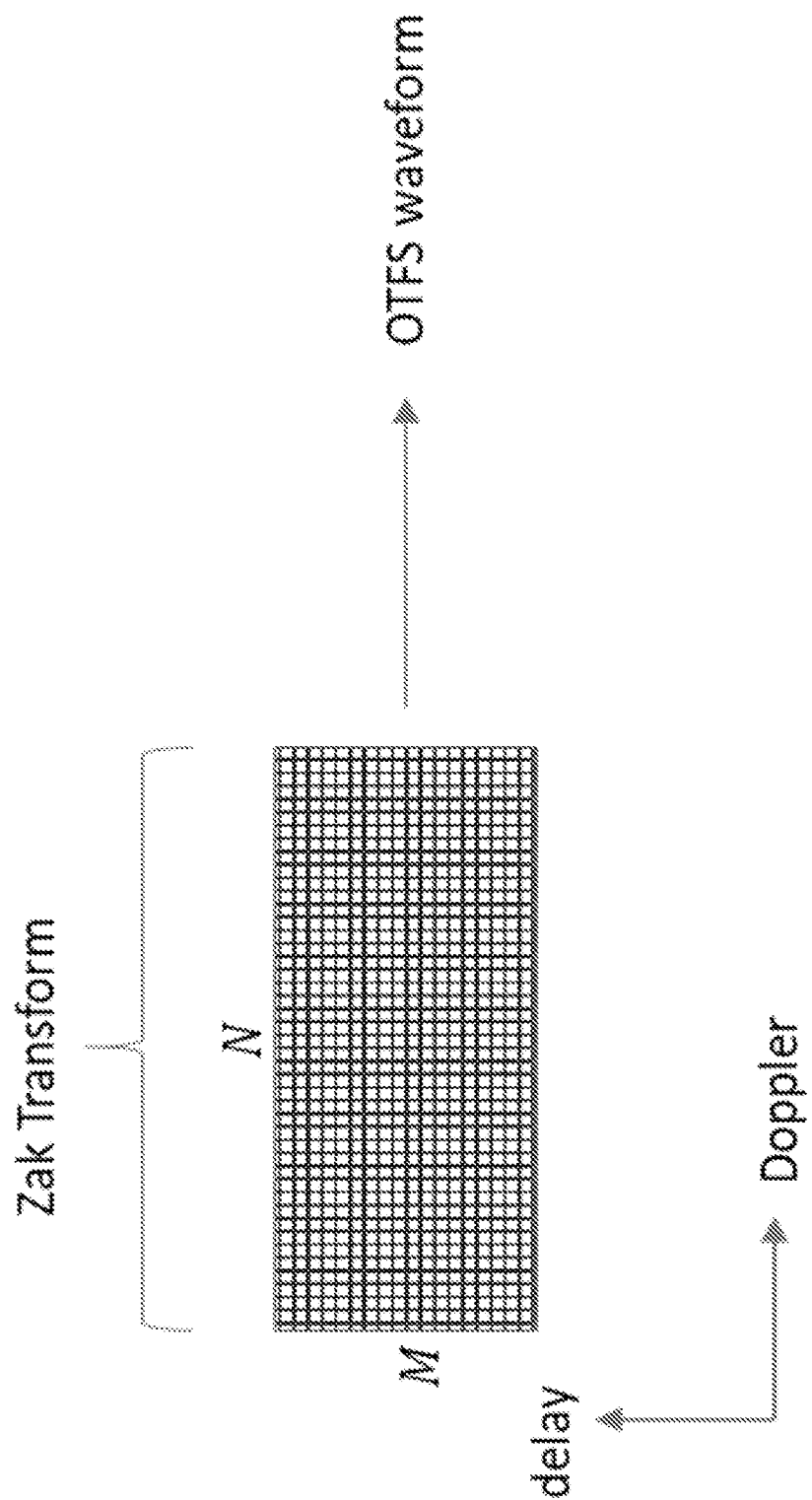
FIG. 6 shows an example of transmission method in which a delay-Doppler grid is transformed to an OTFS waveform using a Zak transform over the Doppler dimension.

FIG. 6 shows an example of transmission method 3, where a delay-Doppler grid is transformed to an OTFS waveform using the Zak transform over the Doppler dimension.

3.1 Multi-Level Data Segmentation and Encoding

Figure 25:
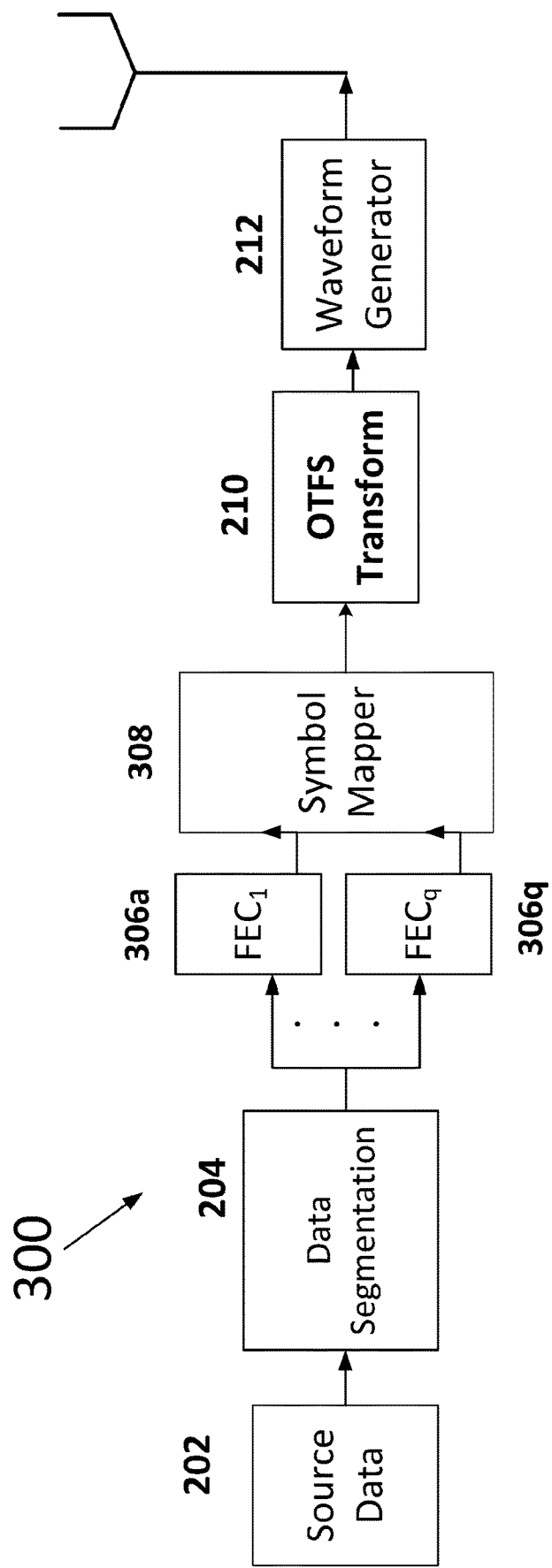
FIG. 25 is a block diagram showing an example of a multi-level transmission system.

FIG. 25 depicts an example of a transmit chain 300 that uses multi-level data segmentation and encoding. In the scheme implemented by the transmit chain 300, shown in FIG. 25, the data is segmented into q multiple blocks of different sizes and encoded in q different levels by multiple FEC codes (306a to 306q) of different rates $R_1, R_2, \ldots, R_q$. In the simplest case, each FEC output is used to map a specific bit in each constellation symbol. For example, 8-QAM may be encoded with 3 levels using 3 different FEC codes. Their output maps the MSB, middle bit and LSB of the constellation symbol's label. In some embodiments, different sets of the multiple FEC codes (306a to 306q), depending on the portion of data packet being sent, may be used. For example, a first FEC code group may be used for headers, while a second FEC code group may be used for payload of the packet being transmitted.

In various embodiments, the number of levels may be smaller than log 2M and each FEC may be connected to more than one bit in the constellation label. For example, in constellation mappings (308) where the real part of the complex constellation is independent of the imaginary part, pairs of constellation bits (one mapped to the real and one mapped to the imaginary) may be encoded together.

In some embodiments, to achieve the best error-rate performance, the different FEC code rates may be optimally selected along with the choice of the constellation mapping.

4. Examples of Receiver Signal Processing

The received waveform is transformed back to delay-Doppler for further processing. This transformation depends on how the waveform was transmitted:

1. A waveform of transmission method 1, is first transformed to a time-frequency grid using a Fast Fourier Transform (FFT) and then the OTFS section of the grid is extracted and converted to delay-Doppler via the Inverse Symplectic Fast Fourier Transform (ISFFT). An example for this is given in FIG. 7.
2. A waveform of transmission method 2, is first transformed to a time-frequency grid using a Fast Fourier Transform (FFT) and then the OTFS sub-grid is extracted and converted to delay-Doppler via the Inverse Symplectic Fast Fourier Transform (ISFFT). An example for this is given in FIG. 8.
3. A waveform of transmission method 3, is transformed directly to delay-Doppler via an inverse Zak transform over the time dimension, as shown in FIG. 9. Afterwards, a receive two-dimensional pulse may be applied to it.

Figure 7:
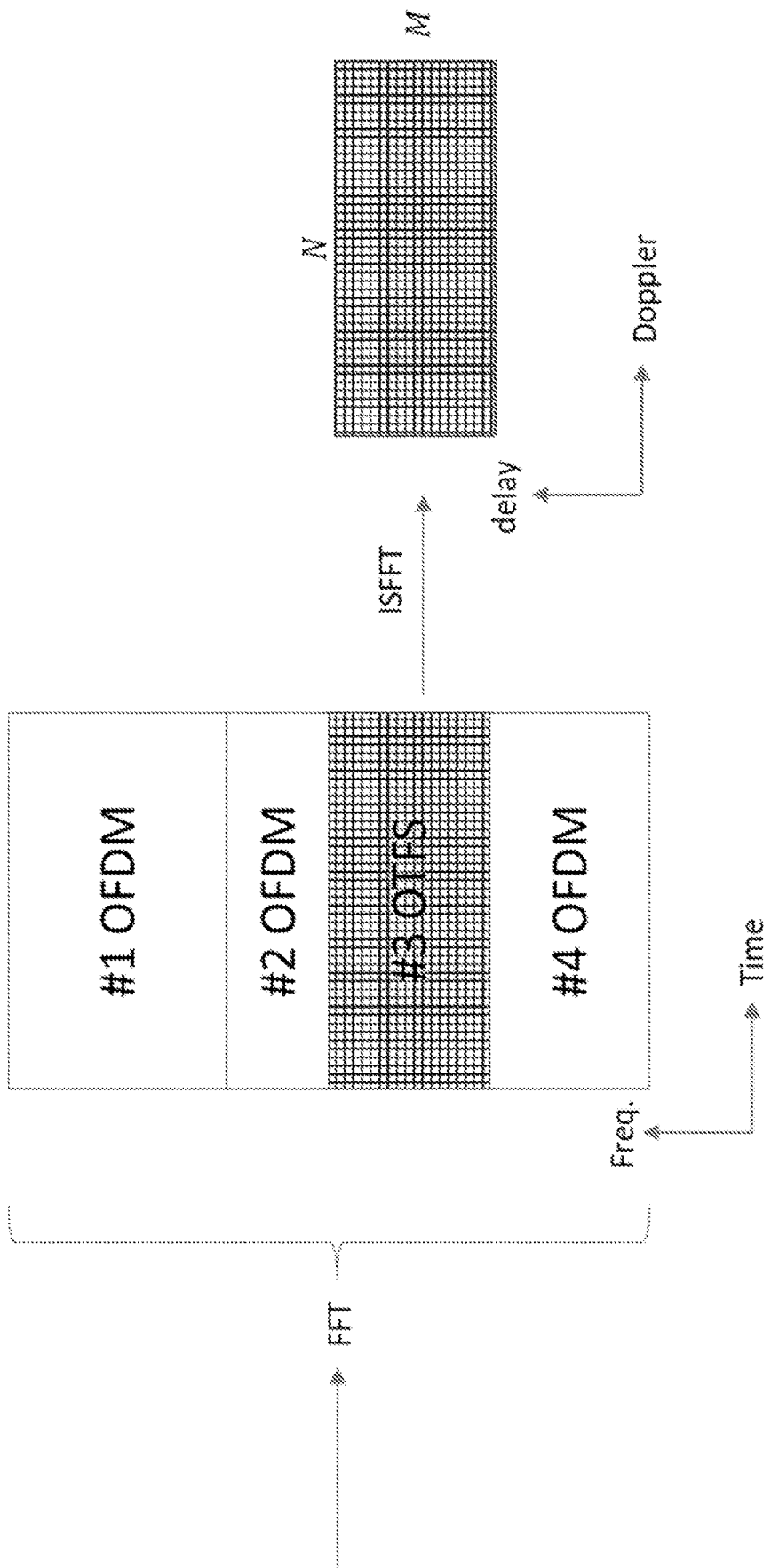
FIG. 7 shows an example of a reception method in which Inverse SFFT (ISFFT) is used to recover information bits from a received waveform.

FIG. 7 depicts a receiver processing example for a waveform generated by transmission method 1. The received waveform is transformed to a time-frequency grid using a Fast Fourier Transform (FFT) and the OTFS part (denoted as "#3 OTFS") is extracted and transformed to delay-Doppler via an Inverse Symplectic Fast Fourier Transform (ISFFT).

Figure 8:
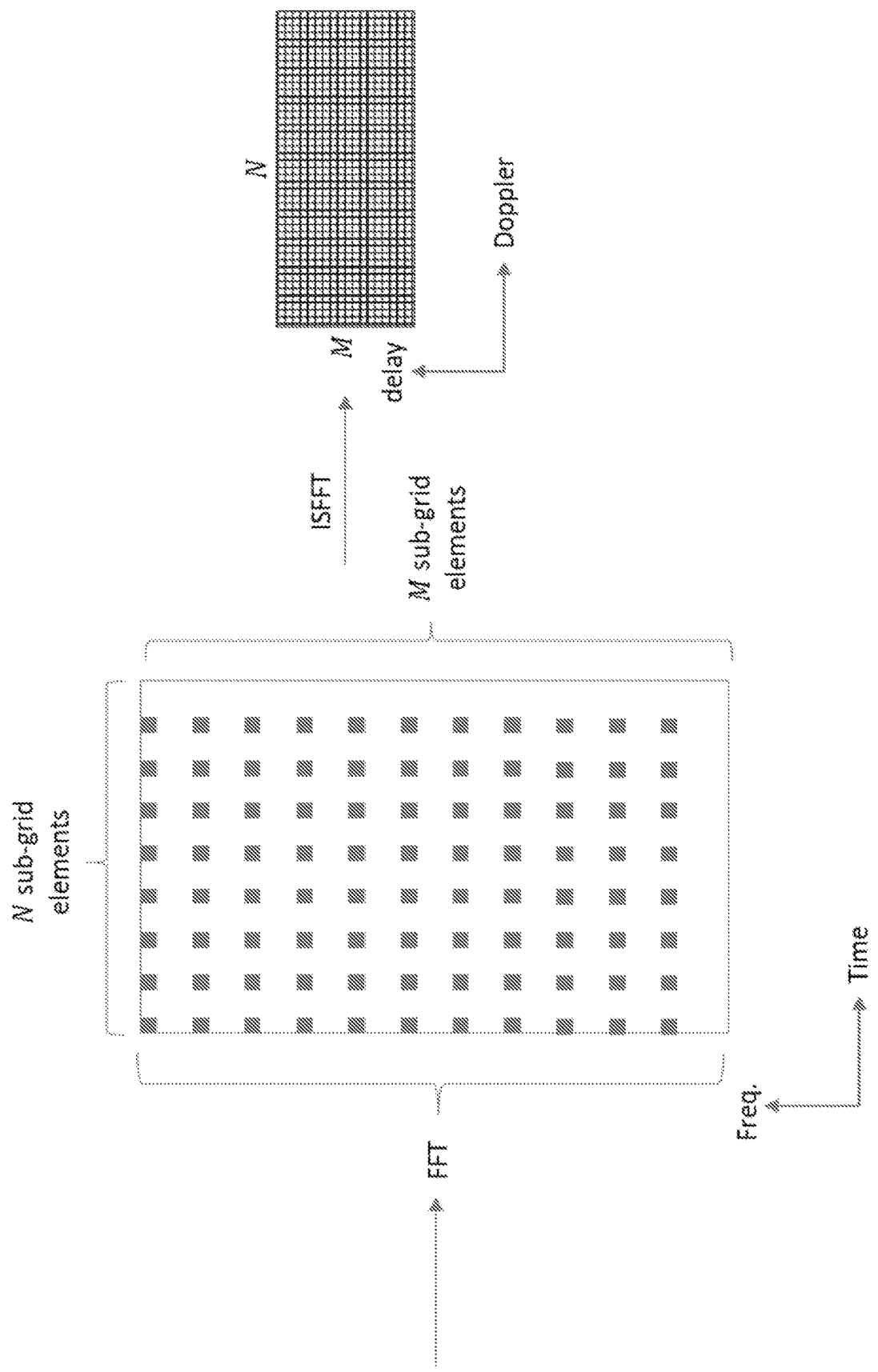
FIG. 8 shows an example of a reception method in which Inverse SFFT (ISFFT) is used to recover information bits from an OTFS sub-grid of a received waveform.
Figure 9:
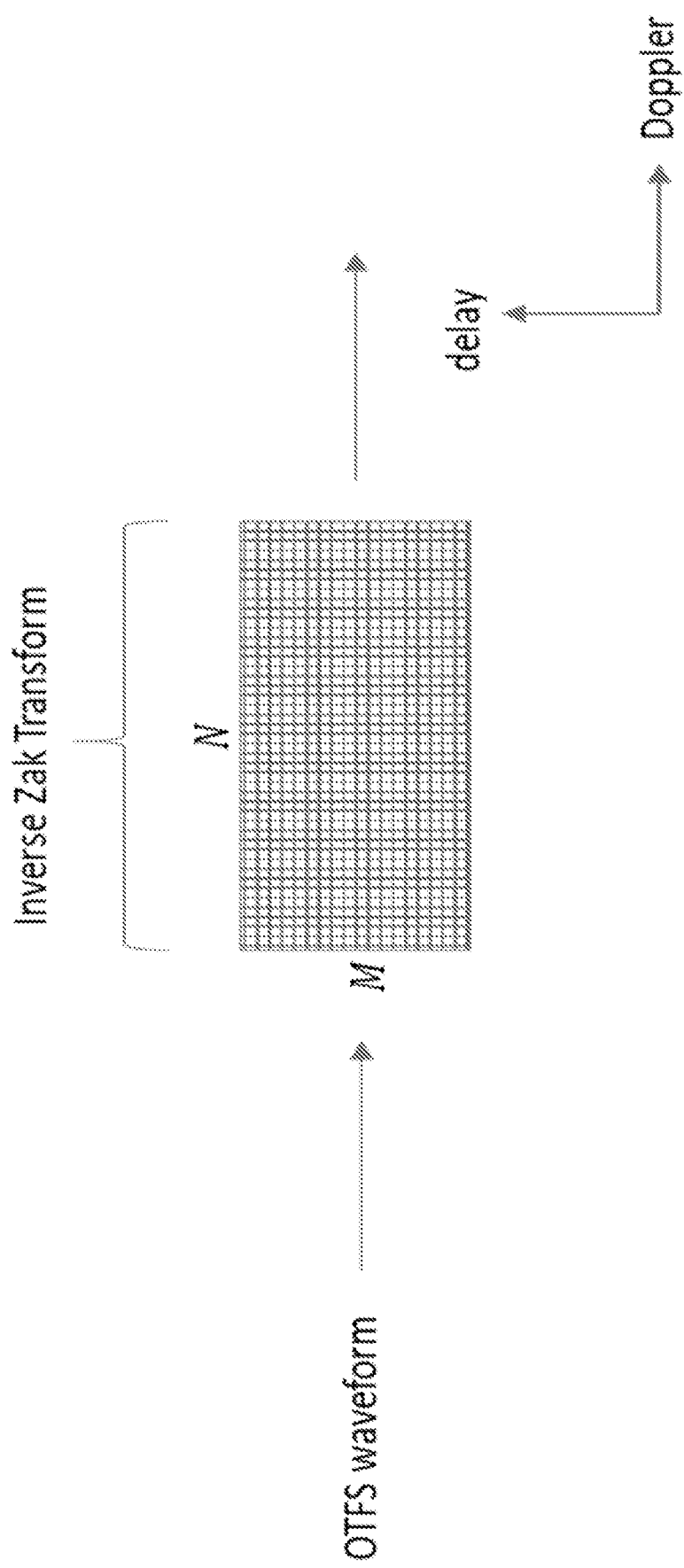
FIG. 9 shows an example of a reception method in which an inverse Zak transform over the time dimension is used to recover information bits from a received waveform.

FIG. 8 depicts a receiver processing example for a waveform generated by transmission method 2. The received waveform is transformed to a time-frequency grid using a Fast Fourier Transform (FFT) and the OTFS sub-grid is extracted and transformed to delay-Doppler via an Inverse Symplectic Fast Fourier Transform (ISFFT).

FIG. 9 depicts a receiver processing example for a waveform generated by transmission method 3. The received OTFS waveform is arranged in a grid N×M elements and transformed to delay-Doppler via the inverse Zak transform over the time dimension.

In some embodiments, the described embodiments include receiver signal processing that can be configured to implement iterative equalization and decoding of multi-level encoded symbols (in Section 4.1) and iterative two-dimensional (2-D) equalization (in Section 4.2).

4.1 Iterative Equalization and Decoding of Multi-Level Encoded Symbols

Figure 26:
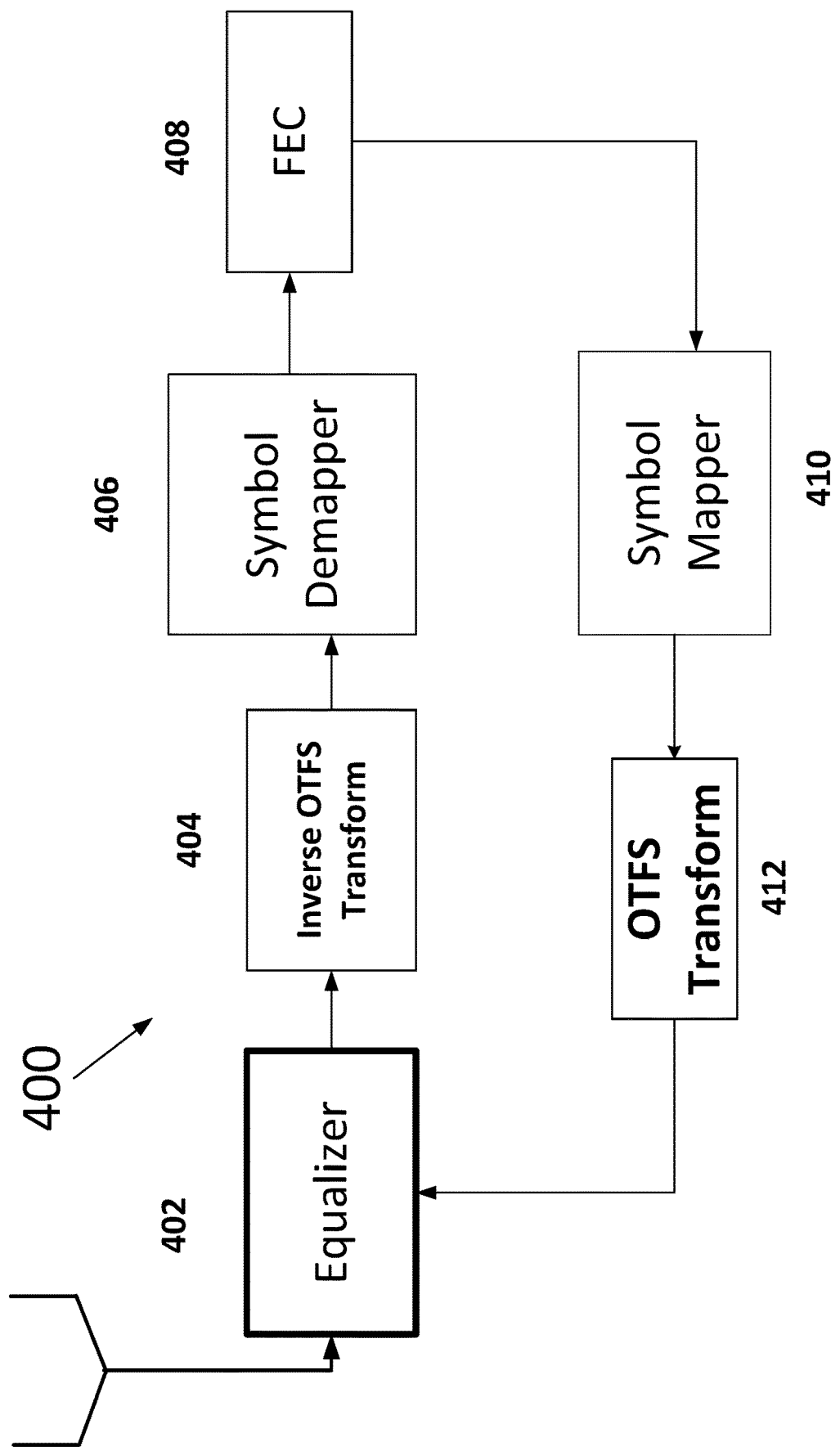
FIG. 26 shows a block diagram of an example iterative receiver apparatus.

In general, iterative receivers exchange extrinsic information between the equalizer and the FEC decoder to achieve close to optimal performance, as shown in FIG. 26 for an OTFS receiver 400. The extrinsic information may include a priori knowledge of which transmission resources (e.g., time slots of subcarriers) use which particular FEC. For example, the equalizer 402 uses prior information on the data symbols coming from the FEC feedback path to improve the equalization of the symbols. This feedback path comprises a symbol mapper 410 and OTFS transformation module 412. Then, these symbols are converted to bit likelihoods that are FEC decoded. Several iterations are performed until all the source data is decoded correctly, or until some other stopping criteria is met. An inverse OTFS transform module 404 may apply inverse OTFS transform and a symbol demapper 406 may recover bits from modulation symbols.

Compared to other techniques described next, the error-rate performance of the scheme 400 may be degraded. One reason for the degradation may be because of the mixture of bits with different level of reliability in every FEC codeword that is being decoded. The constellation bits with low reliability make it harder for the FEC decoder to converge to the correct codeword and therefore, the feedback to the equalizer has less information to improve the equalization.

Figure 27:
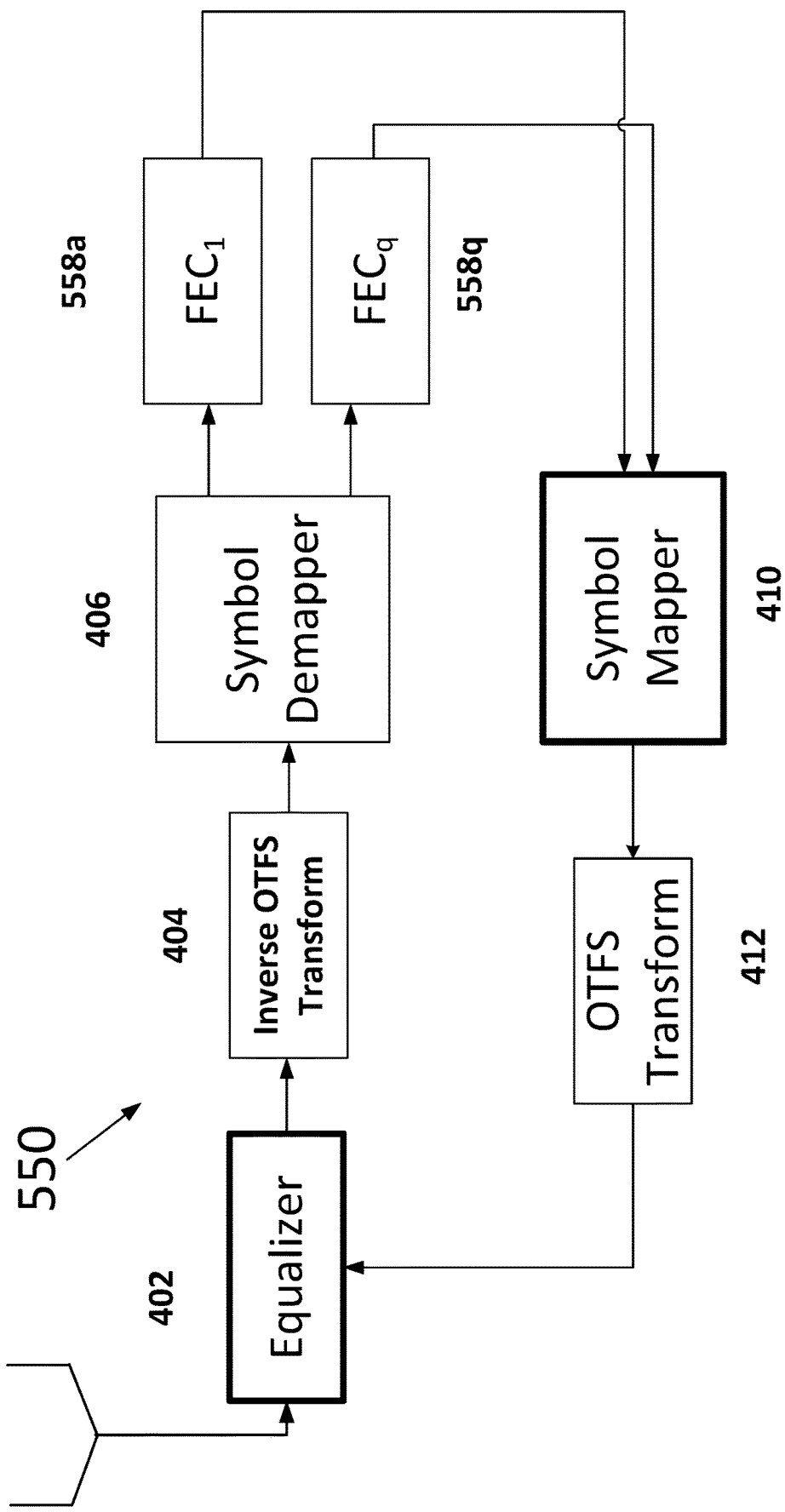
FIG. 27 shows a block diagram of an example iterative receiver apparatus that uses multi-level decoding.

When multi-level encoding is applied at the transmitter (e.g., as shown in FIG. 25), the iterative receiver 550, in each decoding iteration, decodes only a part of the constellation bits. It typically starts with the most reliable bits and then proceeds in the next iterations to less reliable ones. This scheme, shown in FIG. 27, allows the equalizer to receive in earlier iterations priors, which are dominant from the constellation symbols point of view and better improve the equalization. When the FEC has successfully decoded one level, it switches to decode the next one. The receiver continues to iterate until all levels have been decoded successfully or until some other stopping criteria is met. The most reliable bits are often bits that are used to decide the "macro" region within the constellation map where a symbol lies—e.g., the quadrant in which a constellation symbol of a 4 or 8 QAM signal lies, followed by sub-quadrant within the quadrant, and so on. Thus, as shown in FIG. 27 the received signal may be equalized by the equalizer 402. In the forward path, the equalized signal may undergo an inverse OTFS transform (404), and the symbols from the resulting transformed signal may be demapped for decoding by multiple different FECs FEC1 to FECq (modules 558a to 558q). In the feedback path, the decoded symbol (bit) outputs of the FEC modules may be mapped to symbols (410) and transformed into OTFS domain signals (symbols) for feedback to the equalizer 402. As described above, in some implementations, different forward error correction codes are used for symbols from the multiple symbols corresponding to header and payload portions of the bits from the signal.

4.2 Iterative Two-Dimensional (2-D) Equalization

Figure 28:
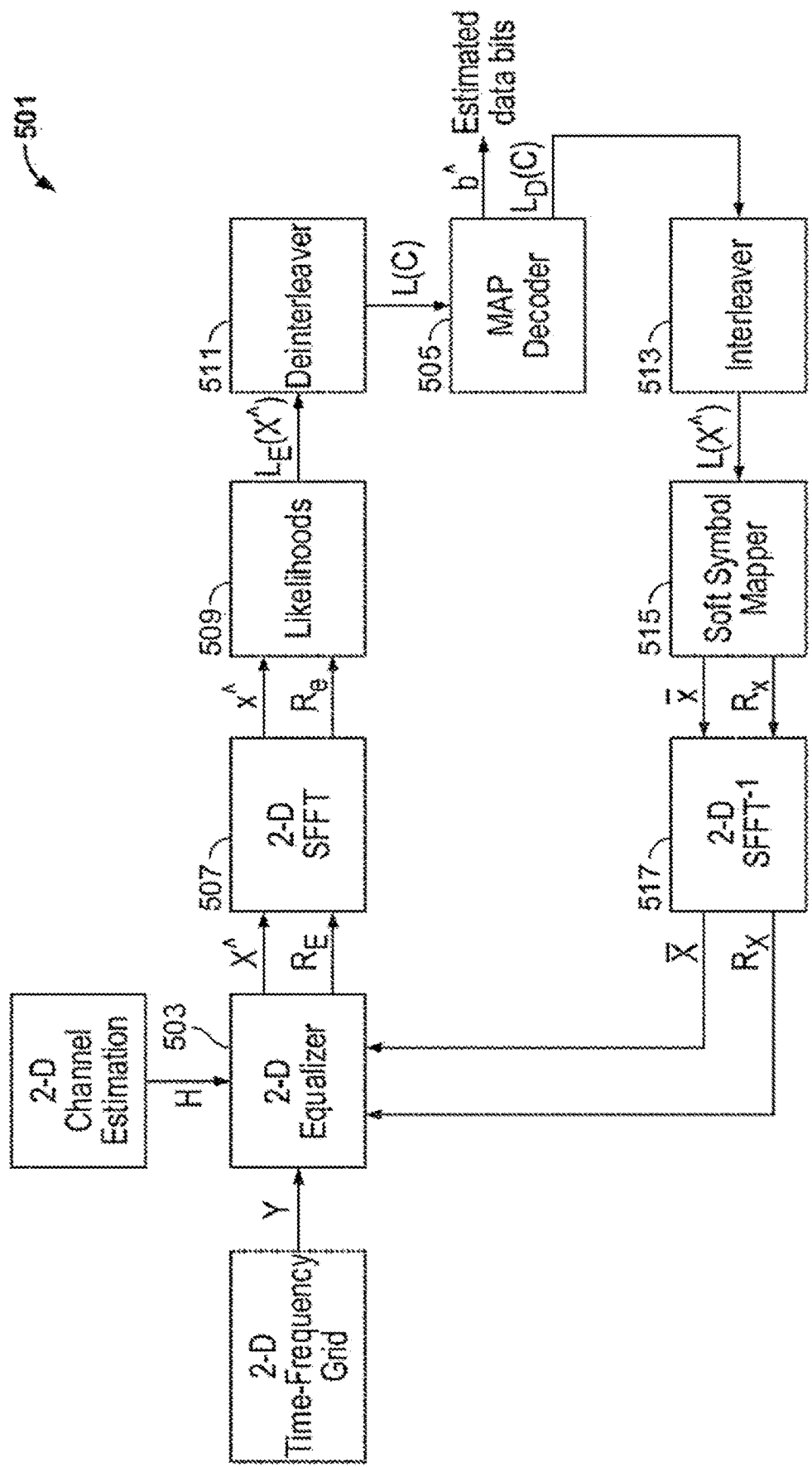
FIG. 28 is a block diagram showing an example 2-D iterative equalizer.

FIG. 28 is a block diagram of an example embodiment of an iterative 2-D equalizer 501. The 2-D Iterative equalizer, illustrated in FIG. 28, iterates between the 2-D equalizer 503 and the FEC MAP decoder 505, by passing information from one to the other. After several iterations, the MAP decoder outputs estimation on the information bits. In various embodiments, the iteration termination criteria may be based on a total number of iterations, meeting, but not exceeding, a time budget for the iterative process, the improvement in successive iterations falling below a threshold, and so on.

4.2.1 Example Embodiments of the 2-D Equalizer (503)

In some embodiments, the 2-D equalizer may be implemented as an affine MMSE equalizer, computing the Wiener estimator of X $$\hat{X} = CY + (I - CH)\overline{X} \qquad \text{Eq (2)}$$

Herein, $C = R_{XY} R_Y^{-1}$ and I is the identity matrix. Note that C is a function of $R_X$ and $R_W$. For the first iteration there is no prior information on the symbols of X, therefore we set $\overline{X} = 0$ and $R_X = I$. The 2-D equalizer also computes the variance of the estimation error, denoted as $R_E$.

4.2.2 2-D SFFT (507)

The estimated symbols and error variances, $\hat{X}$ and $R_E$ respectively, are transformed from the 2-D Time-Frequency grid to the 2-D Delay-Doppler grid via a 2-D Symplectic Fourier transform to $\hat{x}$ and $R_e$ respectively.

4.2.3 Likelihoods (509)

Likelihoods for the coded bits $L_E(\hat{x})$, are computed from the symbols $\hat{x}$. Gaussian distribution may be assumed for $\hat{x}$ and the likelihoods can be derived from it. The probabilities for this case are $$P(\hat{x} \mid x = \omega) \propto e^{-\frac{1}{R_Z}(\hat{x} - \mu(\omega, A))^2} \qquad \text{Eq (3)}$$

Herein, $\omega \in \Omega$ is a constellation symbol, $A = 1 - R_e R_X^{-1}$, $R_Z = AR_e$ and $\mu(\omega, A) = \omega A + (1-A)\overline{x}$ (Eq (4)). Note that x is defined in equation (7). For each symbols, the extrinsic coded bits log likelihoods ratio (LLR) can be derived as $$L_E(\hat{x})_i = \log \left( \frac{\sum_{\omega: s(\omega)_i = 1} P(\hat{x} \mid x = \omega) \cdot \prod_{j \neq i} P(\omega)_j}{\sum_{\omega: s(\omega)_i = 0} P(\hat{x} \mid x = \omega) \cdot \prod_{j \neq i} P(\omega)_j} \right)$$

Herein, i, j=0, ..., q-1, s($\omega$) is the constellation bits label that is associated with the constellation symbol $\omega$ and $P(\omega)_j$ is defined in equation (6).

4.2.4 Deinterleaver (511)

The deinterleaver permutes the likelihoods $L_E(\hat{x})$ to L(C). These likelihoods will be used as a priori information for the MAP decoder. In some implementations this deinterleaver might be optional.

4.2.5 MAP Decoder (505)

The Maximum A Posteriori decoder computes the a posteriori probabilities (APP's) of the information bits and also the extrinsic probabilities for the coded bits, which when using LLRs, are the APP's minus the a priori inputs.

4.2.6 Interleaver (513)

The interleaver permutes the likelihoods $L_D(C)$ to $L(\hat{x})$. These likelihoods will be used as a priori information for the MAP decoder. Note that in some implementations this interleaver might be optional.

4.2.7 Symbol Mapper (515)

The symbol mapper estimates the probabilities of each constellation symbol $\omega \in \Omega$ from the likelihoods values $L(\hat{x})$:

$$P(\omega)j \cong \frac{1}{2}\left(1 + (2 \cdot s(\omega)_j - 1) \cdot \tanh\left(\frac{L(\hat{x})_j}{2}\right)\right)$$

$$P(\omega) \cong \prod_{j=0}^{q-1} P(\omega)_j$$

These probabilities are used for computing the expectation of the constellation and the variance:

$$\bar{x} = \sum_{i=0}^{q-1} \omega \cdot P(\omega)$$

$$R_x = \sum_{i=0}^{q-1} \omega \omega^H P(\omega) - \bar{x}\bar{x}^H$$

4.2.8 2-D SFFT$^{-1}$ (517)

The 2-D Delay-Doppler domain symbols' expectation and variance $\bar{x}$ and $R_X$ are transformed to $\bar{X}$ and $R_X$ in the 2-D Time-Frequency domain using a 2-D Inverse Symplectic Fourier transform to transform from the delay-Doppler domain to the Time-Frequency domain. These are used as priors to the 2-D Equalizer in the next iteration. In some embodiments, the 2-D transforms used by operation 507 and 517 may be swapped. In other words, an inverse SFFT may be used in the operation 507, while an SFFT may be used in the operation 517.

In some embodiments, the iterative 2-D Equalizer may be operated so that the receiver gets side information about some resource elements in the time-frequency grid that have been "erased" (e.g., not transmitted, or not useable) and the receiver can ignore them. The receiver may skip equalization for these resources and just uses directly the prior estimates as outputs for the equalizer. In this case, Eq (2) simply becomes for these resources: $\hat{X}=\bar{X}$.

5. Example Implementations of Iterative Decoding of OTFS in Delay-Doppler

5.1 Overview

Figure 10:
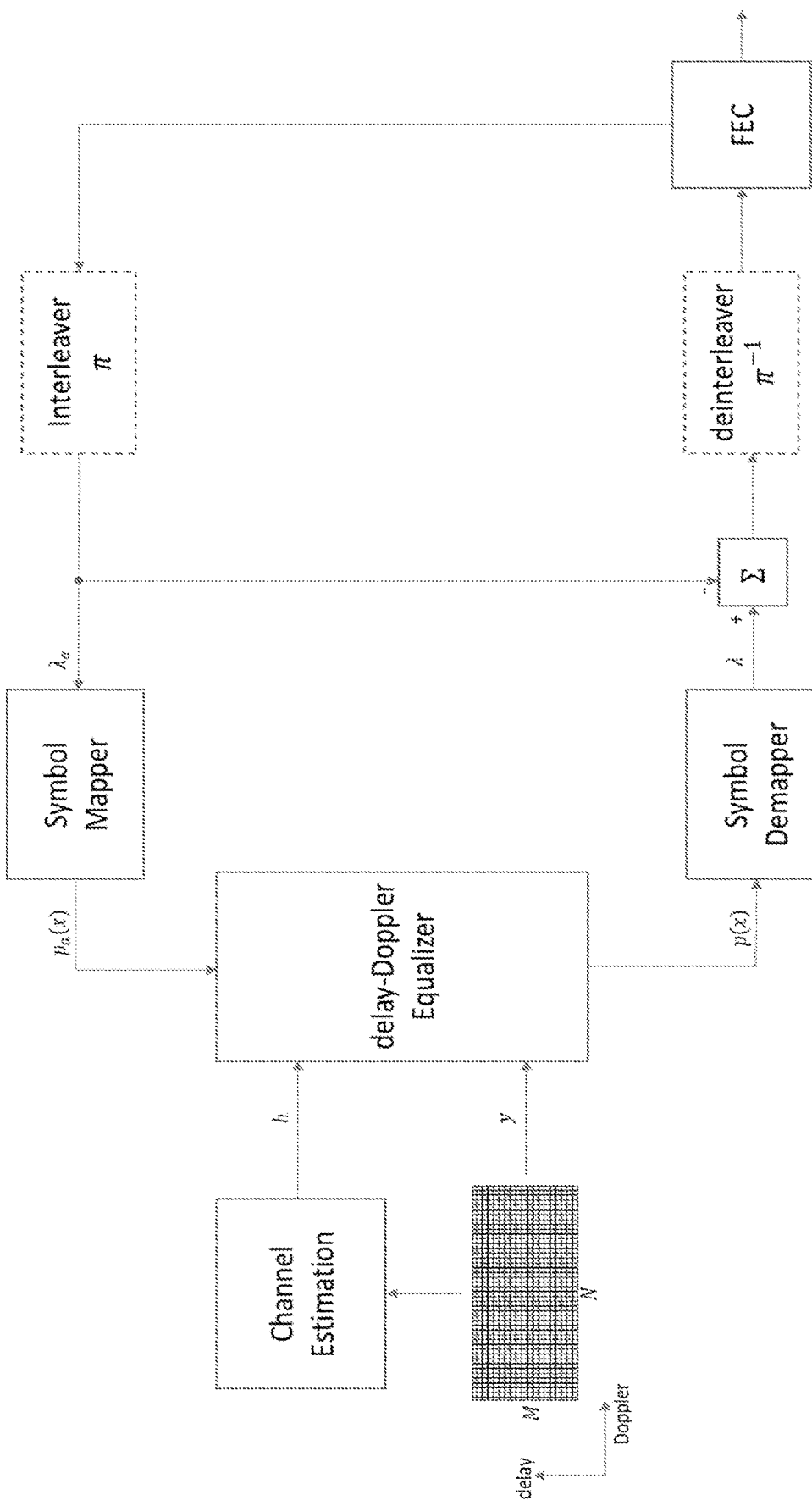
FIG. 10 depicts an example of an iterative decoder in which a single forward error correction (FEC) code is processed.

The iterative decoder, illustrated in FIG. 10, uses for an input the received delay-Doppler grid of dimensions N×M. A received grid element is denoted by y[n, m], where n=0, 1, ..., N−1 and m=0, 1, ..., M−1. First, the channel estimation module, extracts the channel response h, from the channel estimation area in the delay-Doppler grid. Then, a delay-Doppler equalizer generates A Posteriori probability estimation of the data symbols, p(x), based on y, h and the a priori probability $p_a(x)$, which is fed-back from a previous iteration of the decoder. A symbol demapper module, computes bit Log-Likelihoods Ratios (LLRs), $\lambda$, from the a posteriori probability, p(x). Extrinsic LLRs are derived by subtracting from $\lambda$, the a priori LLRs, $\lambda_a$, computed in the previous iteration. The extrinsic LLRs may be deinterleaved and then they are fed into the FEC for decoding. If decoding is successful, the decoded information bits are passed to the next module following the iterative decoder for further processing. If decoding is not successful, the FEC will output coded bit LLRs, which may be interleaved and then fed into the symbol mapper as, $\lambda_a$. The symbol mapper computes symbol a priori symbol probabilities, $p_a(x)$, for the next iteration. Iterations are terminated, when there is a successful decoding in the FEC, or some other criterion is met, such as maximum number of iterations.

Figure 11:
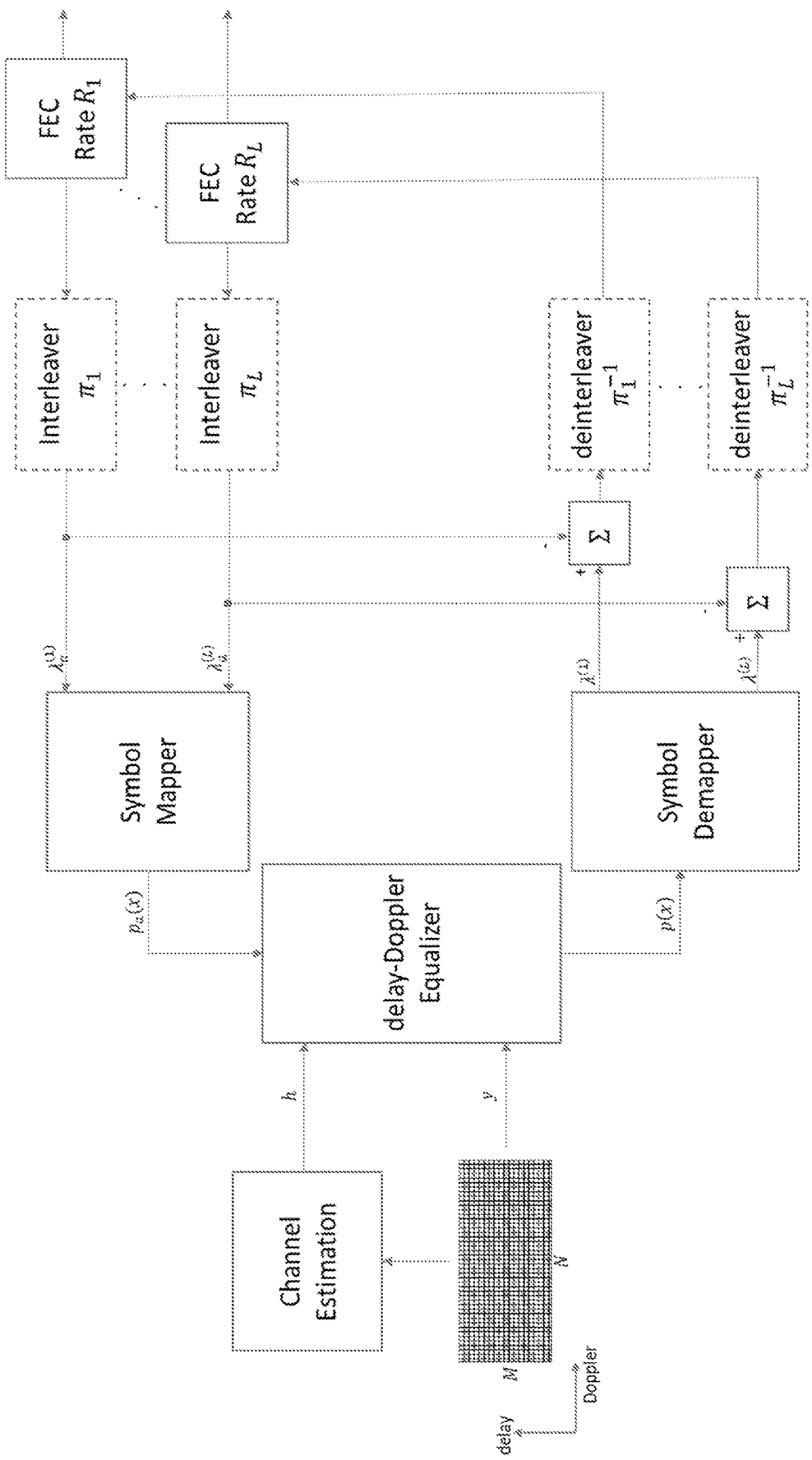
FIG. 11 shows an example of an iterative decoder architecture for multi-level-coding (MLC) FEC.

If the transmission processing was based on MLC, the basic iterative decoder is modified to accommodate it as well, as illustrated in FIGS. 11 and 27. The LLRs from the symbol demapper are split into the different levels, optionally deinterleaved and then fed to the different FEC decoders. The coded bits LLRs output of the different FEC decoders are optionally interleaved and fed back to the symbol mapper.

FIGS. 10 and 26 show examples of iterative decoder architectures for a single FEC.

FIGS. 11 and 27 show examples of iterative decoder architectures for multi-level coding (MLC) FEC, and are discussed in Section 4.1.

5.2 Channel Estimation

For each antenna port, the transmitter may allocate a unique pilot symbol in the channel estimation area of the delay-Doppler grid, at location $[n_p, m_p]$. At the receiver, this pilot symbol will be convolved with the channel response and thus allow computing it from the received delay-Doppler grid elements, y.

More specifically, let y' be the received delay-Doppler grid elements, at the channel estimation area (or some part of this area) and zero otherwise, cyclically shifted to the location of the pilot. Let $\Omega=\{\Omega_1, \Omega_2, \ldots\}=\{[n_1, m_1], [n_2, m_2], \ldots\}$ be a set indexes in the delay-Doppler grid of y', which satisfy:

$$|y'[n_i, m_i]|^2 \geq \varphi$$

where $\varphi$ is a threshold defined by the receiver and $i=1, 2, \ldots, |\Omega|$.

The channel response, h, is a vector of these received values:

$$h=[h_1, h_2, \ldots, h_{|\Omega|}]=[y'[n_1,m_1], y'[n_2,m_2], \ldots, y'[n_{|\Omega|}, m_{|\Omega|}]]$$

and the channel equation can be approximated as:

$$y[n, m] \cong \sum_{i=1}^{|\Omega|} h_i \cdot x[(n - n_i) \bmod N, (m - m_i) \bmod M]$$

Note, that $h_1$, corresponds to the location of the pilot symbol (non-ISI term). Each received element in the delay-Doppler grid, y, is connected to $|\Omega|$ different data symbols, x, through the channel response, h, as illustrated in FIG. 12.

Figure 12:
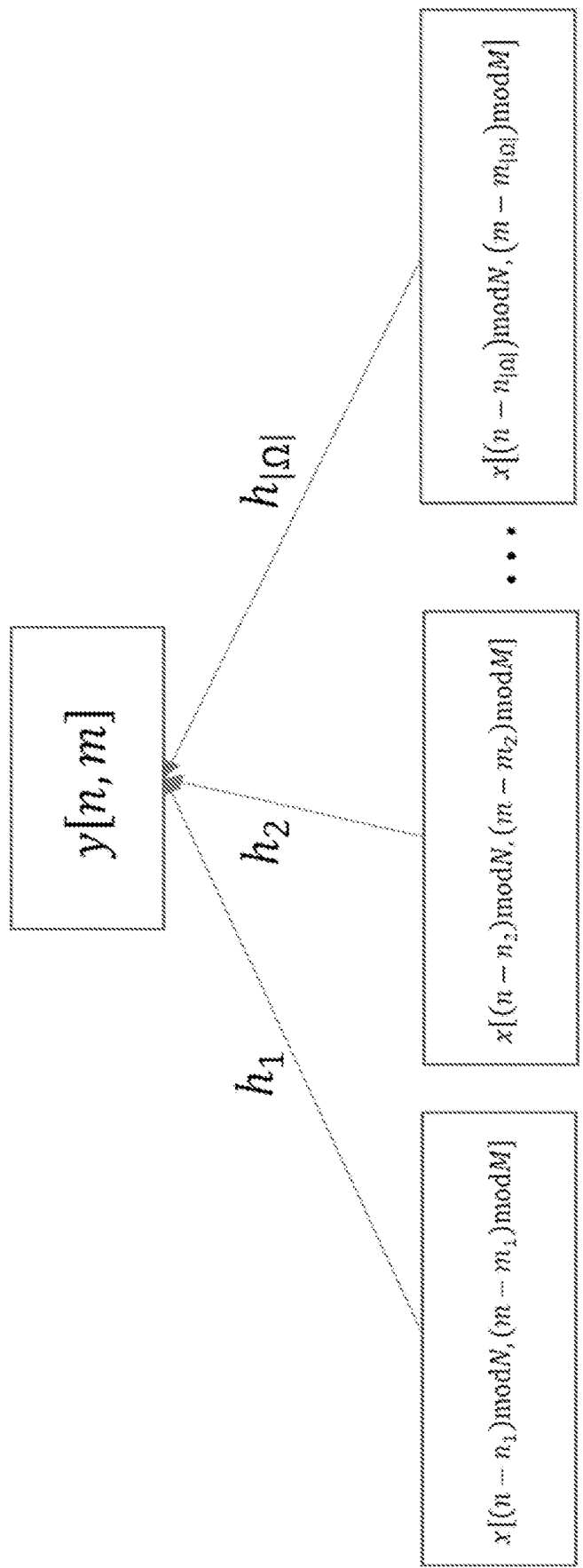
FIG. 12 is an illustration of the channel equation.

FIG. 12 is an illustration of the channel equation.

5.3 Delay-Doppler Equalization

The a posteriori probability equalizer, computes for each delay-Doppler data symbol, x[n, m], the estimated symbol probabilities $$p(\hat{x}_k[n,m])=Pr(x[n,m]=c_k|y,h)$$

Where, C, is the set of symbol constellation points of which the symbols were selected at the transmitter and $c_k \in C$.

The a posteriori probability can be also computed and approximated as $$p(\hat{x}_k[n, m]) = Pr(y | x[n, m] = c_k, h) Pr(x[n, m] = c_k) \cong$$

$$Pr(x[n, m] = c_k) \prod_{[n',m'] \in S[n,m]} Pr(y[n', m'] | x[n, m] = c_k, h)$$

where, $S[n, m]$, is a set of delay-Doppler grid indexes, $[n', m']$, of which the corresponding received delay-Doppler elements, $y[n', m']$, are connected to data symbol $x[n, m]$, through the channel response, h.

In some existing implementations (e.g., Raviteja et al., "Low-Complexity Iterative Detection for Orthogonal Time Frequency Space Modulation"), an iterative message-passing solution to this problem is given for the case of uniform priors, $$Pr(x[n, m] = c_k) = \frac{1}{|C|},$$

and ideal channel estimation. The novel approach presented in this document, uses non-uniform priors, which are fed back from the FEC, along with a channel response that is directly extracted from the received signal.

Note, that the iterative decoder may consist of components that are also being individually processed iteratively, such as the equalizer and the FEC decoder. The configuration of number of iterations for each one of these components and the iterative decoder itself, is an optimization parameter of the design.

5.4 Symbol Demapper

The symbol demapper module converts symbol probabilities into bit LLRs. Each constellation point, $c_k$, is associated with a known bit labeling, $L_k = [L_k(0), L_k(1), \ldots, L_k(Q-1)]$, where $L_k(q) \in \{0, 1\}$, $q=0, 1, \ldots, Q-1$, and $Q = \log_2|C|$. The extrinsic LLRs of symbol $x[n, m]$ are computed as $$\lambda[Q \cdot (n \cdot M + m) + q] = \log\left(\frac{\sum_{k=1, L_k(q)=0}^{Q} p(\hat{x}_k[n, m])}{\sum_{k=1, L_k(q)=1}^{Q} p(\hat{x}_k[n, m])}\right) - \lambda_a[Q \cdot (n \cdot M + m) + q]$$

5.5 Interleaving/Deinterleaving

The interleaver module permutes the order of the LLRs. The deinterleaver modules does the inverse permutation of the interleaver. These modules are optional.

5.6 Forward Error Correction (FEC)

Forward error correction is applied to the LLRs. The FEC decoder may also be an iterative decoder for codes such as Low-Density-Parity-Check (LDPC) codes or Turbo codes. If the FEC decoder is successful in decoding, it passes the corrected information bits to the next module following the iterative receiver. If not, it generates LLRs for the coded bits, which are passed to the interleaver module.

5.7 Symbol Mapper

The symbol mapper converts the coded bits LLRs, computed by the FEC, $\lambda_a$, to constellation symbols probability vectors, $p_a(x[n, m])$, where its k-th element (k=0, 1, ..., $|C|-1$) is computed as:

$$p_a(x[n, m])_k = \frac{1}{|C|}\prod_{q=0}^{Q-1}\left(1 + (2L_k(q) - 1) \cdot \tanh\left(\frac{\lambda_a[Q \cdot (n \cdot M + m) + q]}{2}\right)\right)$$

6. Iterative Decoder with Improved Channel Estimation

The purpose of the guard area in the channel estimation part of the delay-Doppler grid, is to avoid interference from the data symbols to the channel response, and vice versa. For a better spectral efficiency, it is desired that the guard area will be as small as possible. The following method allows using a smaller guard area, while refining the channel estimation through the decoder iterations, by removing interference from data symbols that have already been estimated. In this iterative decoder architecture, illustrated in FIG. 13, the symbol mapper output probabilities for the data symbols, $p_a(x[n, m])$, is fed to the channel estimation module as well. Each data symbol, $x[n, m]$, that "leaks" into, $y[n, m]$, in the channel estimation area, through the channel response is estimated as $$\bar{x}[n, m] = \sum_{k=1}^{|C|} c_k \cdot p_a(x[n, m])_k$$

and then subtracted from $y[n, m]$:

$$\hat{y}[n, m] = y[m, n] - \sum_{i=2}^{|\Omega|} h_i \cdot \bar{x}[(n - n_i) \bmod N, (m - m_i) \bmod M]$$

Then, a new channel estimation is derived from, $y[n, m]$, every iteration.

Figure 13:
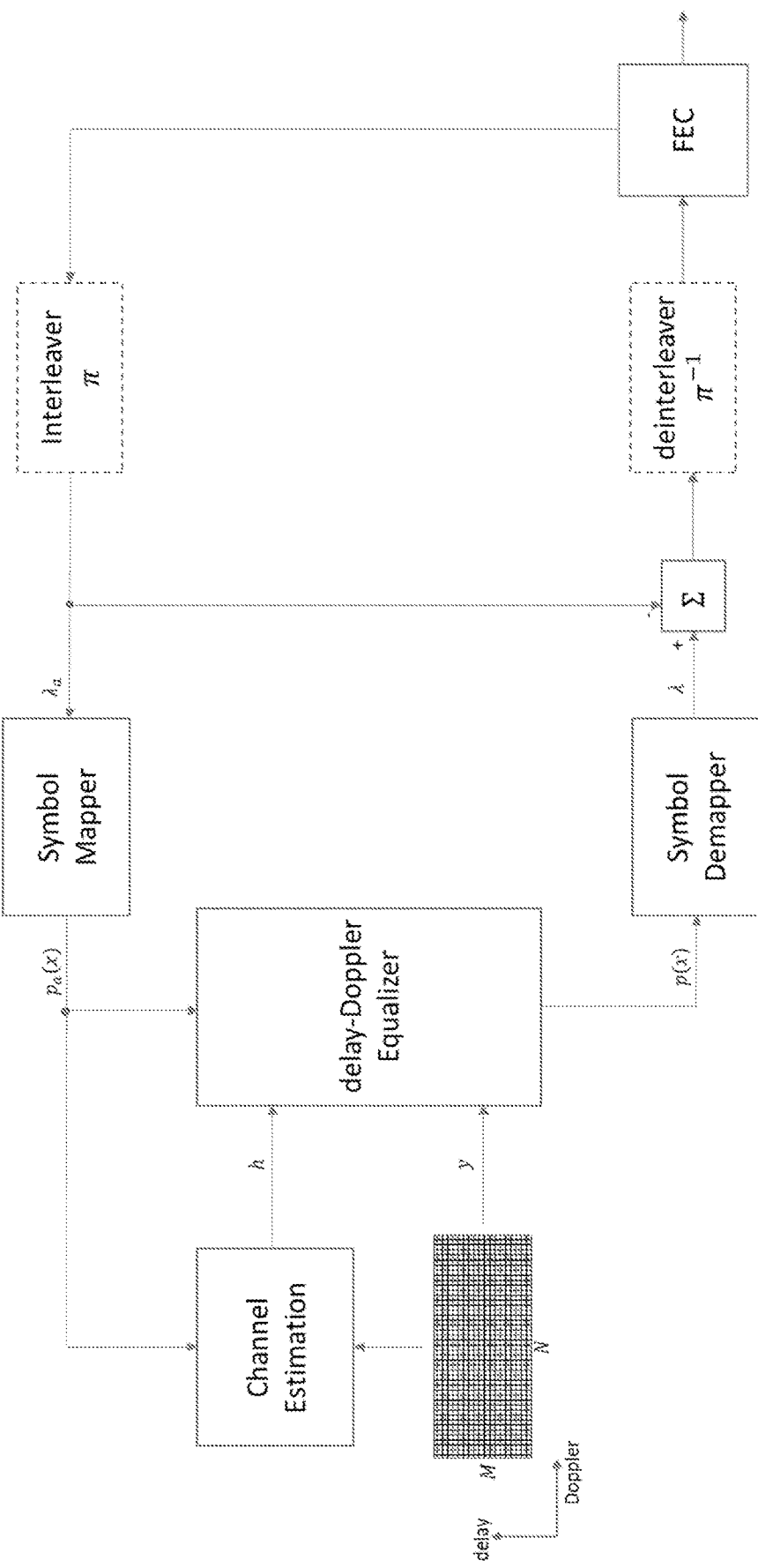
FIG. 13 shows an example of an iterative decoder architecture for improved channel estimation, through the decoder's iterations.

FIG. 13 shows an example of an iterative decoder architecture for improved channel estimation, through the decoder's iterations.

7. Iterative Decoder for Multiple-Input Multiple-Output (MIMO)

The iterative decoder described in the previous sections can be easily extended to support multiple antenna ports at the receiver and the transmitter, also known as, Multiple-Input-Multiple-Output (MIMO). At the transmitter side, a different delay-Doppler grid may be transmitted each one of the $N_{tx}$ antenna ports. Each delay-Doppler grid should have a unique pilot symbol at the channel estimation area. The different pilot symbols should be separated enough, to prevent from their received channel responses to overlap. An example for this, for two antenna ports ($N_{tx}=2$), is given in FIG. 14.

Figure 14:
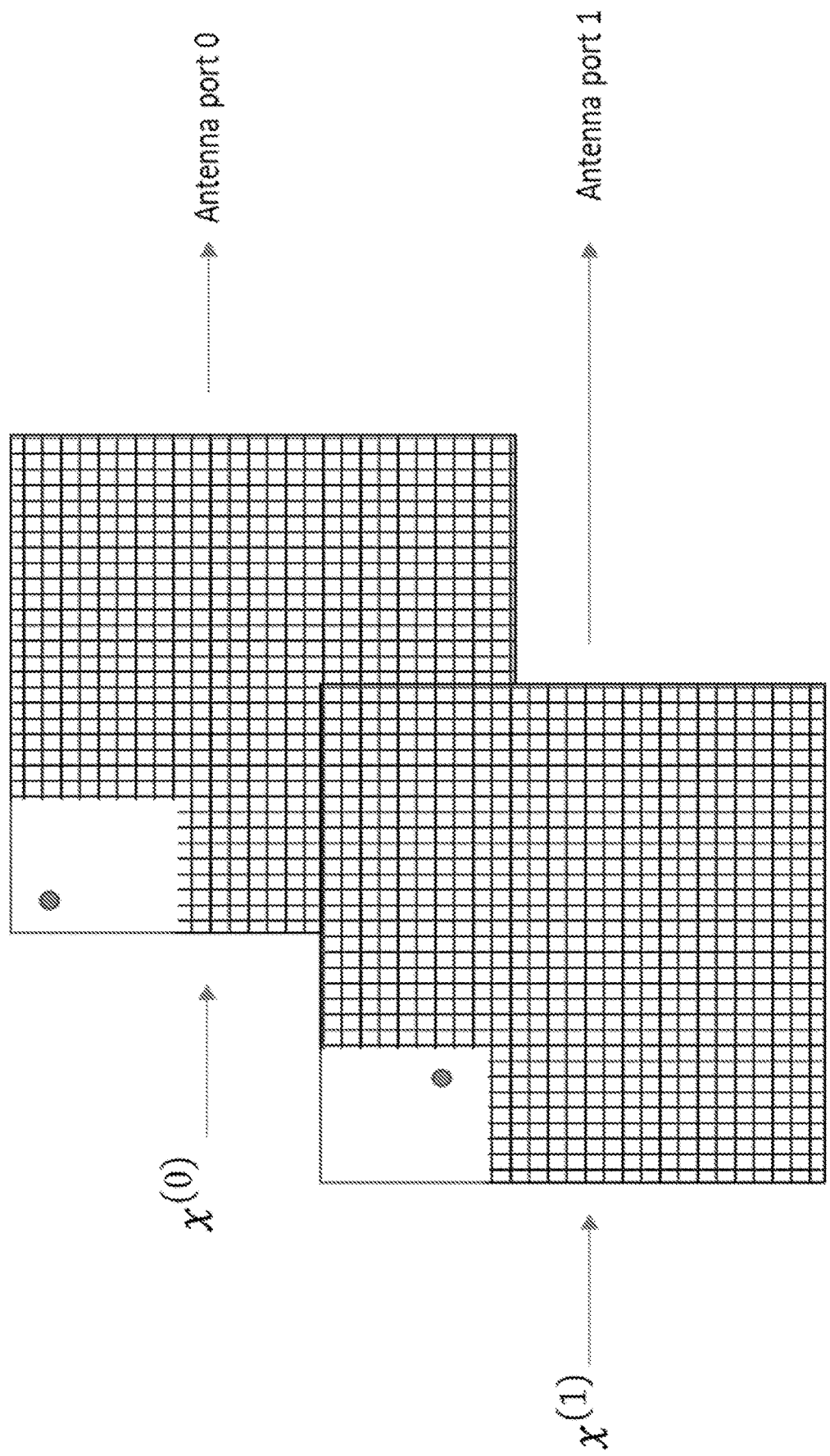
FIG. 14 depicts a two-antenna multi-input multi-output (MIMO) example.

FIG. 14 depicts a transmitter example, with two antenna ports. Two different streams of delay-Doppler symbols, $x^{(0)}$ and $x^{(1)}$ are mapped to two delay-Doppler grids, leaving the channel estimation area empty, except for a pilot symbol. The pilot symbols are separated enough, that the channel response from each one of them does not overlap.

Then, the receiver may have a delay-Doppler grid for each receive antenna port, $y^{(0)}, y^{(1)}, \ldots, y^{(N_{rx}-1)}$. Two modules are modified to accommodate MIMO: Channel estimation and equalizer.

7.1 MIMO Channel Estimation

Channel response vectors are derived similarly to the SISO case, for each combination of transmit and receive antenna. These vectors are denoted as, $h'^{(\alpha,\beta)}$, where $\alpha=0, 1, \ldots, N_{rx}-1$ and $\beta=0, 1, \ldots, N_{tx}-1$, and each one has $|\Omega(\alpha,\beta)|$ elements. The channel equation can be written in a matrix format:

$$\begin{bmatrix} y^{(0)}[n, m] \\ \vdots \\ y^{(N_{rx}-1)}[n, m] \end{bmatrix} \cong \sum_{i=1}^{|\Psi|} \begin{bmatrix} h_i^{(0,0)} & \cdots & h_i^{(0,N_{tx}-1)} \\ \vdots & \ddots & \vdots \\ h_i^{(N_{rx}-1,0)} & \cdots & h_i^{(N_{rx}-1,N_{tx}-1)} \end{bmatrix} \begin{bmatrix} x^{(0)}[(n-n_i)\bmod N, (m-m_i)\bmod M] \\ \vdots \\ x^{(N_{tx}-1)}[(n-n_i)\bmod N, (m-m_i)\bmod M] \end{bmatrix}$$

or in a matrix notation:

$$y[n, m] \cong \sum_{i=1}^{|\Psi|} h_i \cdot x[(n - n_i) \bmod N, (m - m_i) \bmod M]$$

where, $\Psi = U_{\alpha,\beta} \Omega^{(\alpha,\beta)}$ is the union of all the channel response indexes and $$h^{(\alpha,\beta)} = \begin{cases} h'^{(\alpha,\beta)} & [n_i, m_i] \in \Omega^{(\alpha,\beta)} \\ 0 & \text{else} \end{cases}$$

7.2 MIMO Equalization

The A Posteriori probability equation changes to a matrix form:

$$p(\hat{x}_k[n,m]) = Pr(x[n,m] = c_k | y, h)$$

Where, $C^{N_{tx}}$, is the set of symbol constellation points of which $N_{tx}$ data symbols were selected at the transmitter, for each delay-Doppler grid element and $c_k \in C^{N_{tx}}$. The a priori and a posteriori probability, p(x) and $p_a$(x) also use a matrix notation. An example, for a MIMO MAP equalizer, using an iterative message-passing approach can be found in existing implementations (e.g., Ramachandran et al. "MIMO-OTFS in High-Doppler Fading Channels: Signal Detection and Channel Estimation").

8. Examples Embodiments of the Disclosed Technology

Figure 17:
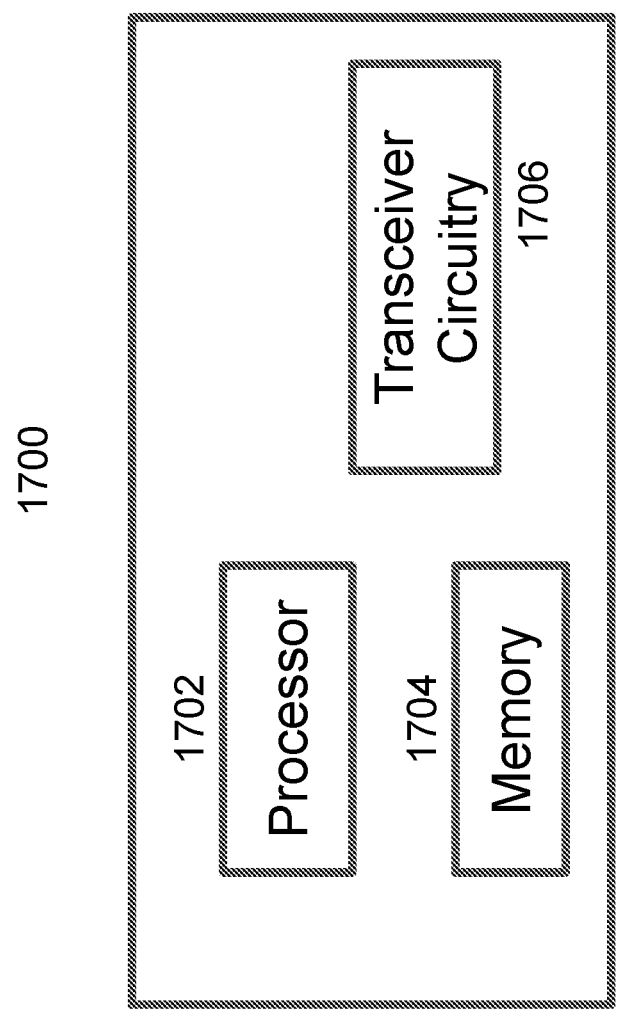
FIG. 17 shows an example of a wireless communication apparatus.

FIG. 17 is a block diagram representation of a wireless hardware platform 1000 which may be used to implement the various methods described in the present document. The hardware platform 1700 may be incorporated within a base station or a user device. The hardware platform 1700 includes a processor 1702, a memory 1704 and a transceiver circuitry (transmission/reception circuitry) 1706. The processor may execute instructions, e.g., by reading from the memory 1704, and control the operation of the transceiver circuitry 1706 and the hardware platform 1700 to perform the methods described herein. In some embodiments, the memory 1704 and/or the transceiver circuitry 1706 may be partially or completely contained within the processor 1702 (e.g., same semiconductor package).

The following examples highlight some embodiments that preferably use one or more of the techniques described herein.

Figure 18:
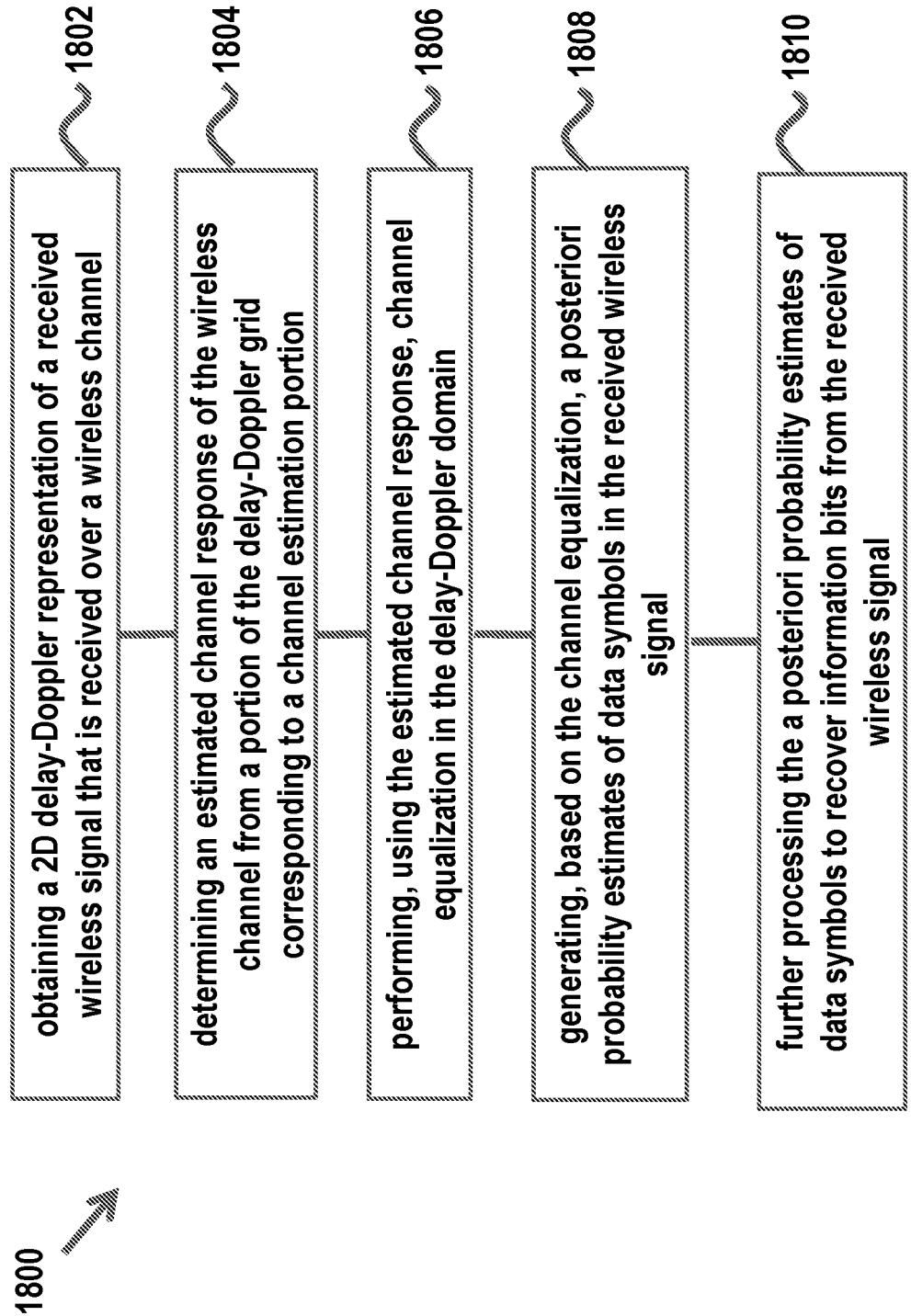
FIG. 18 is a flowchart for an example method of wireless communication.

1. A method of wireless communication (e.g., method 1800 depicted in FIG. 18), comprising: obtaining (1802) a two-dimensional delay-Doppler representation of a received wireless signal that is received over a wireless channel; determining (1804) an estimated channel response of the wireless channel from a portion of the delay-Doppler grid corresponding to a channel estimation portion; performing (1806), using the estimated channel response, channel equalization in the delay-Doppler domain; generating (1808), based on the channel equalization, a posteriori probability estimates of data symbols in the received wireless signal, wherein the a posteriori probability estimates are generated based on a priori feedback that is generated using an iterative process; and further processing (1810) the a posteriori probability estimates of data symbols to recover information bits from the received wireless signal. The received wireless signal may be received, for example, a network device such as a base station of a fixed point access tower, e.g., as depicted in FIG. 15 or 16.

2. The method of example 1, wherein the further processing includes: demapping the a posteriori probability estimates, and computing bit log-likelihood ratios (LLRs) at an output of the demapping. Additional details are described in Section 5 of the present document.

3. The method of example 2, further including, performing error correction decoding on the LLRs. Various error correction codes including Reed Solomon or turbo codes or low density parity check (LDPC) codes may be used.

4. The method of example 1, wherein the a priori feedback includes a priori probability of data symbols from a previous iteration. For example, probabilities from N previous iterations (N=1, 2 or a higher number) may be used.

5. The method of example 4, wherein the a priori probability of data symbols is determined by error correction coded bit log-likelihood ratios (LLRs) generated in a previous iteration of the iterative process. Additional details are described in Section 5.

6. The method of example 1, wherein the obtaining the two-dimensional delay-Doppler representation includes applying an inverse Symplectic fast Fourier transform (IS-FFT) to the received wireless signal.

7. The method of example 1, wherein the obtaining the two-dimensional delay-Doppler representation includes applying an inverse Zak transform over time dimension to the received wireless signal.

8. The method of example 3, wherein the error correction decoding is performed for a single forward error correction (FEC) code used for encoding the information bits. In the present document, various FEC codes, including RS, turbo, LDPC etc. may be used.

9. The method of example 3, wherein the error correction decoding is performed for multiple forward error correction codes that are used for a multi-level-coding of the information bits.

10. The method of any of Examples 1-9, wherein the channel equalization in the delay-Doppler domain is performed by computing, for each delay-Doppler data symbol x[n,m], estimated symbol probability using:

$$(\bar{x}_k[n,m]) = Pr(x[n,m] = c_k | y, h)$$

where, $c_k$ is a symbol in C, which is a set of symbol constellation points of which the symbols were selected at the transmitter, y is the received signal and h is the estimated channel response. Additional details are described in Sections 5-7.

11. The method of example 2, wherein the bit LLRs are deinterleaved prior to performing error correction decoding. Additional details are described in Sections 5-7.

12. The method of example 11, wherein an output of the error correction decoding is interleaved and input to a symbol mapper in a feedback path for a next iteration of the iterative process. Additional details are described in Sections 5-7.

13. The method of example 1, wherein the estimated channel response is determined using a feedback of symbol probabilities determined in a previous iteration for previously estimated data symbols. Additional details are described in Sections 5-7.

14. The method of example 12, wherein the feedback of symbol probabilities is used to subtract, from the received wireless signal, an estimated contribution of previously estimated data symbols that is weighted according to the symbol probabilities. Additional details are described in Sections 5-7.

Figure 19:
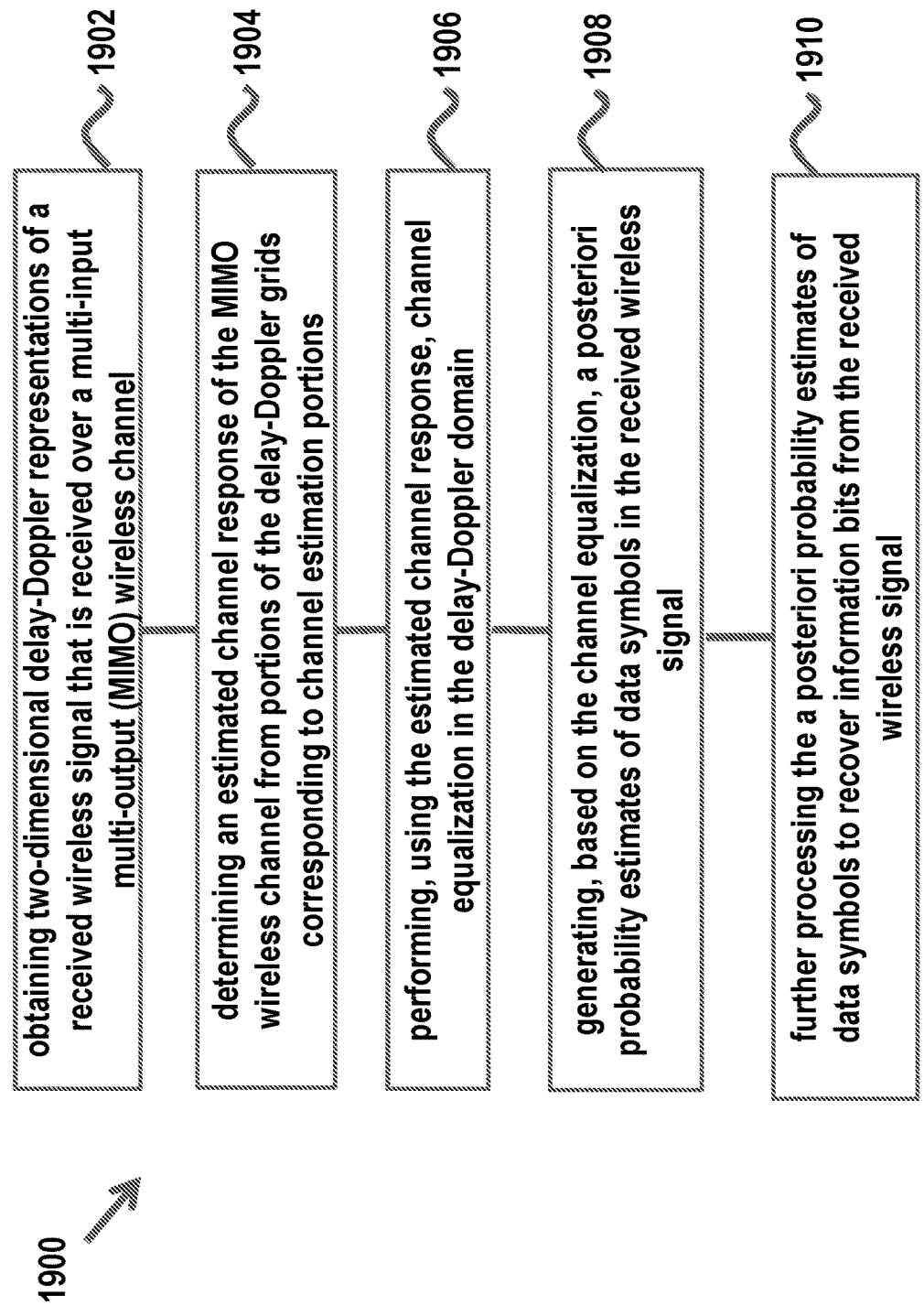
FIG. 19 is a flowchart for an example method of wireless communication.

15. A method of wireless communication (e.g., method 1900 depicted in FIG. 19), comprising: obtaining (1902) two-dimensional delay-Doppler representations of a received wireless signal that is received over a multi-input multi-output (MIMO) wireless channel; determining (1904) an estimated channel response of the MIMO wireless channel from portions of the delay-Doppler grids corresponding to channel estimation portions; performing (1906), using the estimated channel response, channel equalization in the delay-Doppler domain; generating (1908), based on the channel equalization, a posteriori probability estimates of data symbols in the received wireless signal, wherein the a posteriori probability estimates are generated based on a priori feedback that is generated using an iterative process; and further processing (1910) the a posteriori probability estimates of data symbols to recover information bits from the received wireless signal. The received wireless signal may be received, for example, a network device such as a base station of a fixed point access tower, e.g., as depicted in FIG. 15 or 16.

16. The method of example 15, wherein the further processing includes: demapping the a posteriori probability estimates, and computing bit log-likelihood ratios (LLRs) at an output of the demapping. Additional details are described in Section 5 of the present document.

17. The method of example 16, further including, performing error correction decoding on the LLRs. Various error correction codes including Reed Solomon or turbo codes or low density parity check (LDPC) codes may be used.

18. The method of example 15, wherein the a priori feedback includes a priori probability of data symbols from a previous iteration. For example, probabilities from N previous iterations (N=1, 2 or a higher number) may be used.

19. The method of example 18, wherein the a priori probability of data symbols is determined by error correction coding bit log-likelihood ratios (LLRs) generated in a previous iteration of the iterative process. Additional details are described in Section 5.

20. The method of example 15, wherein the obtaining the two-dimensional delay-Doppler representations includes applying inverse Symplectic fast Fourier transforms (IS-FFT) to the received wireless signal. Additional details are described in Sections 1-4.

21. The method of example 15, wherein the obtaining the two-dimensional delay-Doppler representations includes applying inverse Zak transforms over time dimension to the received wireless signal. Additional details are described in Sections 1-4.

22. The method of example 17, wherein the error correction decoding is performed for a single forward error correction code used for encoding the information bits. Additional details are described in Sections 5-7.

23. The method of example 17, wherein the error correction decoding is performed for multiple forward error correction codes that are used for a multi-level-coding of the information bits. Additional details are described in Sections 5-7.

24. The method of any of examples 15-23, wherein the estimated channel response is determined for each combination of transmit and receive antennas.

25. The method of example 16, wherein the bit LLRs are deinterleaved prior to performing error correction decoding. Additional details are described in Sections 5-7.

26. The method of example 25, wherein an output of the error correction decoding is interleaved and input to a symbol mapper in a feedback path for a next iteration of the iterative process. Additional details are described in Sections 5-7.

27. The method of example 15, wherein the estimated channel response is determined using a feedback of symbol probabilities determined in a previous iteration for previously estimated data symbols. Additional details are described in Sections 5-7.

28. The method of example 27, wherein the feedback of symbol probabilities is used to subtract, from the received wireless signal, an estimated contribution of previously estimated data symbols that is weighted according to the symbol probabilities. Additional details are described in Sections 5-7.

Figure 20:
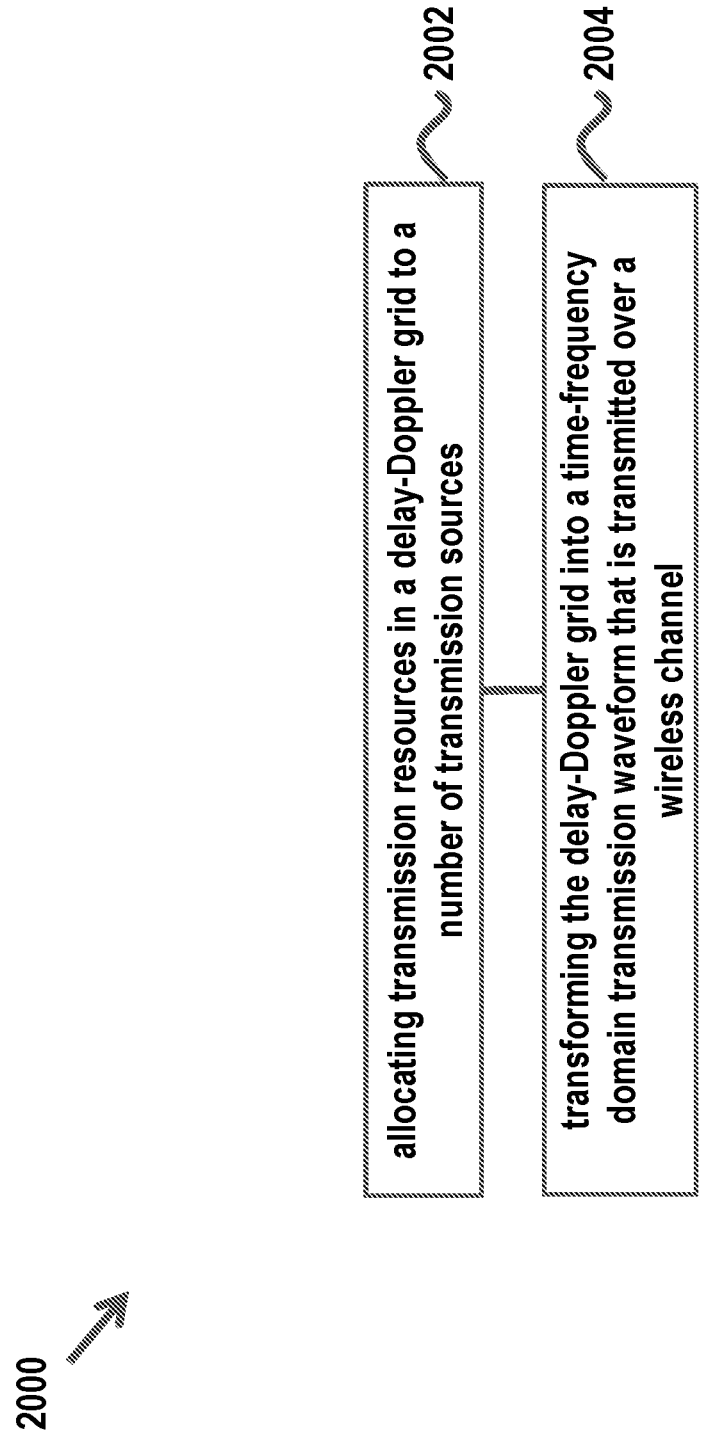
FIG. 20 is a flowchart for an example method of wireless communication.

29. A method of wireless communication, (e.g., method 200 depicted in FIG. 20) comprising: allocating (2002) transmission resources in a delay-Doppler grid to a number of transmission sources; and transforming (2004) the delay-Doppler grid into a time-frequency domain transmission waveform that is transmitted over a wireless channel. Additional details are described in Sections 1-4.

30. The method of example 29, wherein the transmission sources include a reference signal transmission source.

31. The method of example 29-30, wherein the transmission sources include a user data transmission source.

32. The method of any of examples 29-31, wherein the transforming comprises: applying a discrete Symplectic Fast Fourier Transform to the delay-Doppler grid, thereby generating a time-frequency grid; and generating an orthogonal frequency division multiplexing (OFDM) symbol by applying an inverse fast Fourier transform (IFFT) to the time-frequency grid.

33. The method of example 32, wherein, during the generating the OFDM symbol, the time-frequency grid is multiplexed with other signals.

34. The method of any of examples 29-31, wherein the transforming comprises: generating a time-frequency sub-grid by applying a discrete Symplectic Fast Fourier Transform to the delay-Doppler grid; and generating an orthogonal frequency division multiplexing (OFDM) symbol by applying an inverse fast Fourier transform (IFFT) to the time-frequency grid.

35. The method of any of examples 29-31, wherein the transforming comprises: generating the transmission waveform in time domain by applying a Zak transform over Doppler dimension to the delay-Doppler grid. Additional details of the above examples are described in Sections 5-7.

36. A wireless communication apparatus comprising a processor and a transceiver, wherein the processor is configured to perform a wireless signal processing method recited in any one or more of examples 1-35 and the transceiver is configured to transmit or receive wireless signals.

37. A system comprising a plurality of wireless communication apparatus, each apparatus comprising one or more processors, configured to implement a method recited in any one or more of examples 1-35.

38. A computer-readable medium having code stored thereon, the code, when executed by a processor, causes the processor to implement a method recited in any one or more of examples 1-35.

39. A technique, a method or an apparatus disclosed in the present document.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
   obtaining, by a receiver from a transmitter, a two-dimensional delay-Doppler representation of a received wireless signal in a delay-Doppler grid, wherein the received wireless signal is received over a wireless channel;
   determining an estimated channel response of the wireless channel from a portion of the delay-Doppler grid corresponding to a channel estimation portion;
   performing, using the estimated channel response, channel equalization in a delay-Doppler domain that includes generating, for each delay-Doppler data symbol, x [n, m], an a posteriori probability estimate of each delay-Doppler data symbol using $$p(\hat{x}_k[n,m]) = Pr(x[n,m] = c_k | y, h)$$

where, $c_k$ is a symbol in C that is a set of symbol constellation points from which symbols were selected at the transmitter, y is the received wireless signal, and h is the estimated channel response, thereby generating a posteriori probability estimates of data symbols in the received wireless signal, wherein the a posteriori probability estimates are generated based on a priori feedback that is generated using an iterative process; and
   further processing the a posteriori probability estimates of data symbols to recover information bits from the received wireless signal.

2. The method of claim 1, wherein the further processing includes:
   demapping the a posteriori probability estimates, and
   computing bit log-likelihood ratios (LLRs) at an output of the demapping.

3. The method of claim 2, further including, performing error correction decoding on the bit LLRs.

4. The method of claim 1, wherein the a priori feedback includes a priori probability of data symbols from a previous iteration.

5. The method of claim 4, wherein the a priori probability of data symbols is determined by error correction coding bit log-likelihood ratios (LLRs) generated in the previous iteration of the iterative process.

6. The method of claim 1, wherein the obtaining the two-dimensional delay-Doppler representation includes applying an inverse Symplectic fast Fourier transform (ISFFT) to the received wireless signal.

7. The method of claim 1, wherein the obtaining the two-dimensional delay-Doppler representation includes applying an inverse Zak transform over time dimension to the received wireless signal.

8. The method of claim 3, wherein the error correction decoding is performed for a single forward error correction code used for encoding the information bits.

9. The method of claim 3, wherein the error correction decoding is performed for multiple forward error correction codes that are used for a multi-level-coding of the information bits.

10. The method of claim 2, wherein the bit LLRs are deinterleaved prior to performing error correction decoding.

11. The method of claim 10, wherein an output of the error correction decoding is interleaved and input to a symbol mapper in a feedback path for a next iteration of the iterative process.

12. The method of claim 1, wherein the estimated channel response is determined using a feedback of symbol probabilities determined in a previous iteration for previously estimated data symbols.

13. The method of claim 12, wherein the feedback of symbol probabilities is used to subtract, from the received wireless signal, an estimated contribution of the previously estimated data symbols that is weighted according to the symbol probabilities.

14. A wireless communication apparatus, comprising:
a processor configured to:
obtain a two-dimensional delay-Doppler representation of a received wireless signal in a delay-Doppler grid, wherein the received wireless signal is received over a wireless channel;
determine an estimated channel response of the wireless channel from a portion of the delay-Doppler grid corresponding to a channel estimation portion;
perform, using the estimated channel response, channel equalization in a delay-Doppler domain that includes generating, for each delay-Doppler data symbol, x [n, m], an a posteriori probability estimate of each delay-Doppler data symbol using $$p(\hat{x}_k[n,m]) = Pr(x[n,m] = c_k | y, h)$$

where, $c_k$ is a symbol in C that is a set of symbol constellation points from which symbols were selected at a transmitter, y is the received wireless signal, and h is the estimated channel response, thereby generating a posteriori probability estimates of data symbols in the received wireless signal, wherein the a posteriori probability estimates are generated based on a priori feedback that is generated using an iterative process; and further process the a posteriori probability estimates of data symbols to recover information bits from the received wireless signal.

15. The apparatus of claim 14, wherein the processor is further configured, as part of further processing the a posteriori probability estimates, to:
demap the a posteriori probability estimates, and
compute bit log-likelihood ratios (LLRs) at an output of demapping the a posteriori probability estimates.

16. The apparatus of claim 15, wherein the processor is further configured to:
perform error correction decoding on the bit LLRs.

17. The apparatus of claim 16, wherein the error correction decoding is performed for multiple forward error correction codes that are used for a multi-level-coding of the information bits.

18. The apparatus of claim 14, wherein the a priori feedback includes a priori probability of data symbols from a previous iteration.

19. The apparatus of claim 18, wherein the a priori probability of data symbols is determined by error correction coding bit log-likelihood ratios (LLRs) generated in a previous iteration of the iterative process.

* * * * *